(12) United States Patent
Rodgers

(10) Patent No.: US 11,475,617 B2
(45) Date of Patent: Oct. 18, 2022

(54) PATH-CONSTRAINED DRAWING WITH VISUAL PROPERTIES BASED ON DRAWING TOOL

(71) Applicant: Adobe Inc., San Jose, CA (US)

(72) Inventor: Dwight O. Rodgers, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 31 days.

(21) Appl. No.: 17/240,153

(22) Filed: Apr. 26, 2021

(65) Prior Publication Data

US 2021/0248799 A1      Aug. 12, 2021

Related U.S. Application Data

(63) Continuation of application No. 16/373,377, filed on Apr. 2, 2019, now Pat. No. 11,004,247.

(51) Int. Cl.
*G06T 11/80* (2006.01)
*G06F 3/04883* (2022.01)
*G06T 11/20* (2006.01)

(52) U.S. Cl.
CPC .......... *G06T 11/80* (2013.01); *G06F 3/04883* (2013.01); *G06T 11/203* (2013.01)

(58) Field of Classification Search
CPC ..... G06T 11/80; G06T 11/203; G06F 3/04883
USPC .......................................................... 345/441
See application file for complete search history.

(56) References Cited

U.S. PATENT DOCUMENTS

| 2006/0094951 | A1 | 5/2006 | Dean et al. |
| 2010/0002936 | A1 | 1/2010 | Khomo |
| 2010/0261526 | A1 | 10/2010 | Anderson et al. |
| 2011/0148894 | A1* | 6/2011 | Duprat ................. G06T 11/001 345/552 |
| 2019/0291277 | A1 | 9/2019 | Oleynik |
| 2020/0272322 | A1* | 8/2020 | Zhu ...................... G06F 3/0482 |
| 2020/0320763 | A1 | 10/2020 | Rodgers |

OTHER PUBLICATIONS

"Non-Final Office Action", U.S. Appl. No. 16/373,377, dated Jun. 1, 2020, 7 pages.
"Notice of Allowance", U.S. Appl. No. 16/373,377, dated Jan. 12, 2021, 7 pages.
"Pre-Interview First Office Action", U.S. Appl. No. 16/373,377, dated Jul. 20, 2020, 5 pages.

* cited by examiner

*Primary Examiner* — Thomas J Lett
(74) *Attorney, Agent, or Firm* — FIG. 1 Patents

(57) ABSTRACT

In implementations of path-constrained drawing with visual properties based on a drawing tool, a digital artwork editing system includes a user interface in which a constraint path can be designated in a digital artwork. A stroke input can be sampled as it is drawn with a drawing tool and for each processing interval of the stroke input, a start point of the stroke input and a tangent line to the constraint path is determined. An end point of the stroke input is projected onto a parallel line that is through the start point and parallel to the tangent line, and a stroke is rendered along this line. Hence, the stroke is rendered based on the stroke input in a piecewise linear fashion, simultaneously constrained by the constraint path and rendered based on how the drawing tool is used.

20 Claims, 8 Drawing Sheets

PATH-CONSTRAINED DRAWING WITH VISUAL PROPERTIES BASED ON DRAWING TOOL

RELATED APPLICATION

This application is a continuation of and claims priority to U.S. patent application Ser. No. 16/373,377 filed Apr. 2, 2019 entitled "Path-Constrained Drawing With Visual Properties Based On Drawing Tool," the disclosure of which is incorporated by reference herein in its entirety.

BACKGROUND

Designers use artwork editing applications to generate and edit digital artworks, such as digital drawings, digital images, animation sequences, and the like. Most artwork editing applications include tools for drawing, such as a pen or line tool. Designers can use these pen or line tools to draw constrained shapes (e.g., lines, curves, boxes, circles, etc.). For instance, a designer may control the pen or line tool via a mouse to draw a straight line between two points, or one line parallel to another line, and set the thickness of the line by selecting a line thickness in a pull-down menu.

Some artwork editing applications also include or interface with a drawing tool (e.g., a stylus) that allows a designer to control parameters of a drawing stroke made with the drawing tool based on how the designer controls the drawing tool. For instance, the designer may hold a stylus like a regular pencil and draw a stroke on a touch-sensitive surface of a computing device. The stroke may have parameters (e.g., visual properties, such as thickness, smoothness, darkness, etc.) based on the pressure induced on the touch-sensitive surface by the stylus, an angle of the stylus relative to the surface, a rotation of the stylus, or a speed of the stylus across the surface. In this way, the designer can use the stylus to draw electronically in a similar manner as physically drawing with a pencil or paintbrush.

SUMMARY

Techniques and systems are described for path-constrained drawing with visual properties based on a drawing tool. A designer can draw a stroke input on a digital artwork with a drawing tool while simultaneously constraining the stroke (e.g., to be straight) and controlling the stroke's visual properties (e.g., thickness, darkness, smoothness, etc.) based on how the designer wields the drawing tool. An artwork editing system facilitates a user to designate a constraint path, such as a Bezier curve in a digital artwork or a curve or line drawn with a pen tool in the digital artwork. The artwork editing system can sample a stroke input as it is drawn and constrain the stroke when rendered to be parallel to the constraint path over each sampling interval. At each sampling interval, the artwork editing system may determine a start point of the stroke input and a tangent line to the constraint path at a point on the constraint path that is closest to the start point of the stroke input. The artwork editing system can project an end point of the stroke input to a line that is through the start point of the stroke input and parallel to the tangent line, and render the stroke input along this line, rather than how it may be drawn. The artwork editing system may render a stroke in a piecewise linear fashion. Each linear segment corresponds to a sampling interval of the stroke input and is rendered with visual properties based on the drawing tool during the sampling interval. Hence, a designer can use the artwork editing system to simultaneously constrain a stroke (e.g., to be straight, parallel to a constraint path, or on a constraint path) while controlling the stroke's visual properties based on how the designer wields the drawing tool.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
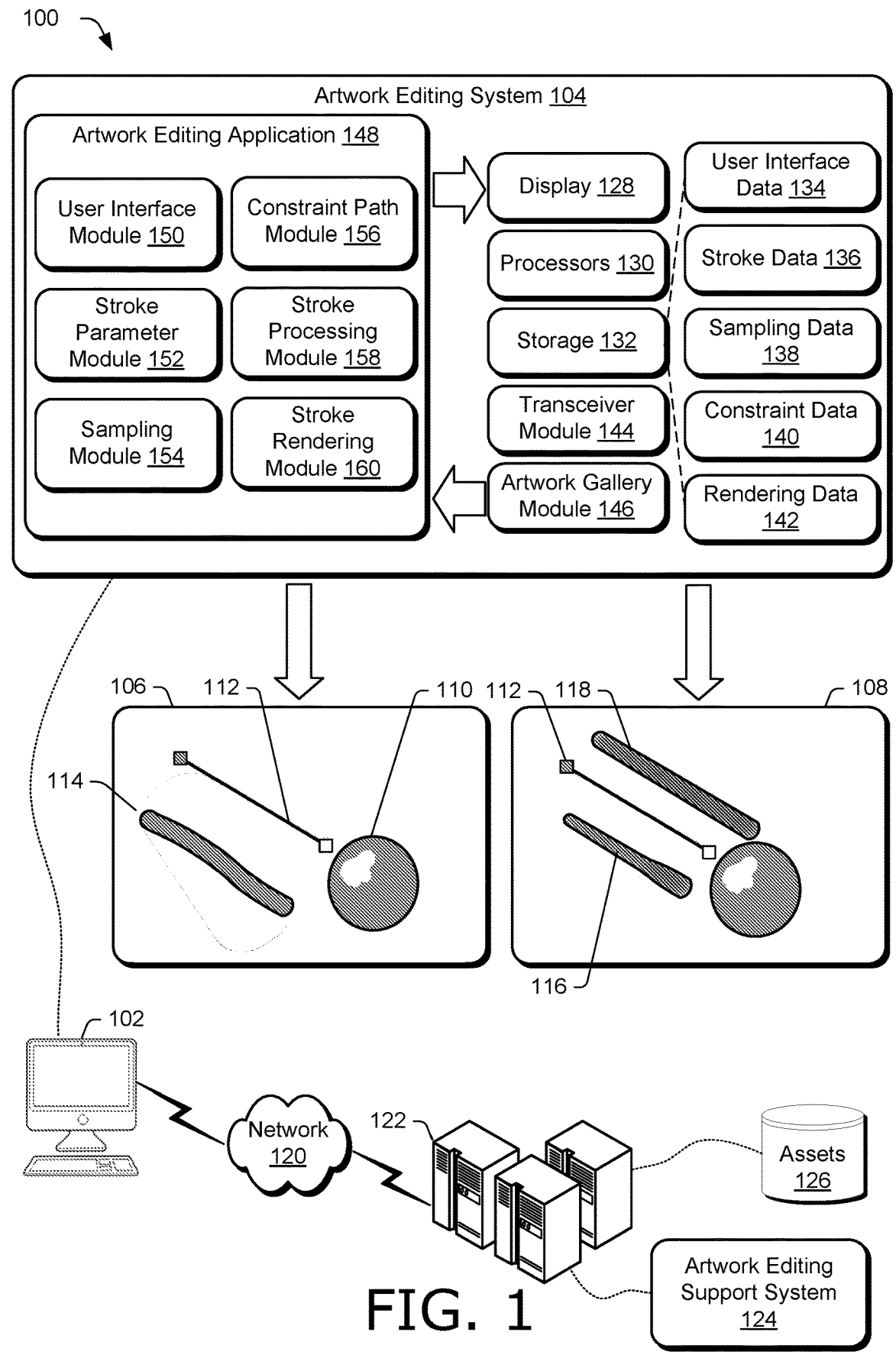
FIG. 1 illustrates a digital medium environment in an example implementation that is operable to employ techniques described herein.

Artwork editing applications allow designers to draw shapes, such as curves and lines, while constraining the shapes when using a pen or line tool. For instance, a designer may use a pen or line tool to precisely draw a line between two points, and set the thickness of the line by selecting a line thickness in a pull-down menu. Some artwork editing applications also allow designers to control visual properties of a stroke drawn with a drawing tool, such as a stylus, based on how the designer controls or wields the drawing tool. For instance, a stroke's visual properties (e.g., thickness, smoothness, darkness, etc.) when rendered may be based on the downward pressure of the stylus, an angle of the stylus, a rotation of the stylus, a speed of the stylus, and the like. However, unlike a pen tool that allows the designer to constrain a line precisely (e.g., to be perfectly straight and between two exact points), artwork editing applications that allow designers to control visual properties of a stroke drawn with a drawing tool, such as a stylus, do not allow the designer to precisely constrain the stroke as they would be able to with a pen or line tool, such as by constraining the stroke to draw as a straight line between two points, or parallel to a straight line. Hence, the rendered stroke is subject to inaccuracies introduced by human manipulation of the drawing tool, such as nonlinearities caused by shaky hands.

To address these deficiencies, some artwork editing applications apply a stroke smoothing algorithm to a stroke. A stroke smoothing algorithm acts to remove nonlinearities, such as caused by a designer's jittery hand, but does not constrain the stroke or enforce a specific shape of the stroke, such as requiring the stroke to be parallel to another stroke. Artwork editing applications may also clip strokes with masks to force the stroke to fit into an exact shape. However, the resulting clipped strokes usually include undesirable distortions, such as clipped pixels at the edges of the masks, rather than shaping the stroke accurately.

To overcome these shortcomings, designers may resort to physical rather than electronic drawing aids. For instance, a designer may place a ruler on a touch-sensitive surface and a stylus against the ruler to electronically draw a straight stroke having visual properties (e.g., thickness, darkness, smoothness, etc.) based on how the designer wields the stylus. However, the ruler itself may interfere with the designer's intended angle, pressure or speed of the stylus, so that the rendered stroke is not acceptable to the designer. Consequently, a designer may draw a stroke using a pen or line tool to constrain the shape of the stroke, and then manually edit the stroke's visual properties characteristics, which is time consuming Accordingly, conventional artwork editing applications often produce poor results, and designers are burdened with cumbersome work-around methods that are inefficient.

Accordingly, this disclosure describes systems, devices, and techniques for path-constrained stroke drawing with visual properties of the stroke based on tool properties of a drawing tool (e.g., a pressure, rotation, angle, speed, etc. of the drawing tool). Hence, a designer can draw a stroke input on a digital artwork with a drawing tool while simultaneously constraining the stroke (e.g., to be straight, parallel, etc.) and controlling the stroke's visual properties (e.g., thickness, darkness, smoothness, etc.) when rendered based on how the designer wields the drawing tool. An artwork editing system includes a user interface that facilitates a user to designate a path as a constraint path. A user can designate any suitable path as a constraint path, such as a Bezier curve in a digital artwork (e.g., an artwork represented by vector graphics), a curve or line drawn with a pen tool, a curve according to an equation, such as a cubic spline, an unconstrained curve (e.g., a curve that does not adhere to a mathematical formula, such as a freely-drawn curve), and the like. In one example, the artwork editing system implements a machine learning algorithm to determine a feature curve in a digital artwork, and a user may designate the feature curve as a constraint path in a user interface of the artwork editing system.

The artwork editing system can sample a stroke input as it is drawn with a drawing tool, and process the stroke input for each interval between samples to constrain the stroke as it is rendered relative to the constraint path, such as to be parallel to the constraint path over each sampling interval. The artwork editing system can determine sampling intervals (e.g., stroke processing intervals between samples of strokes) in any suitable way. In one example, the artwork editing system determines the stroke processing intervals based on the constraint path to ensure that the constraint path is sufficiently sampled so that no aliasing occurs. For instance, the artwork editing system may determine the stroke processing intervals based on a curvature of the constraint path, such as a curvature determined from one or more derivatives of tangents to the constraint path, so that stroke processing intervals for a highly-curved constraint path are smaller than stroke processing intervals for a less-curved constraint path. Additionally or alternatively, the artwork editing system may determine the stroke processing intervals based on a time duration, such as a time between samples determined from a refresh rate of a display exposing the user interface of the artwork editing system. Additionally or alternatively, the artwork editing system may determine the stroke processing intervals based on a distance between samples of the stroke input.

At each stroke processing interval, the artwork editing system is implemented to determine a start point of the stroke input and a point on the constraint path that is closest to the start point of the stroke input. The artwork editing system can then determine a tangent line that is tangent to the constraint path at the point on the constraint path that is closest to the start point of the stroke input. The artwork editing system can also determine a parallel line that is parallel to the tangent line and through the start point of the stroke input. The artwork editing system can then render a stroke based on this parallel line at each stroke processing interval, thus constraining the rendered stroke to be parallel to the constraint path, such as in a piecewise linear fashion over multiple stroke processing intervals.

For instance, the artwork editing system can determine an end point of the stroke input drawn with a drawing tool at each stroke processing interval, and project this end point onto the parallel line. The artwork editing system can then render a stroke based on the stroke input between the start point of the stroke input and the point on the parallel line formed from the projection. For instance, the artwork editing system may render the stroke at each stroke processing interval as a line segment with visual properties (e.g., thickness, smoothness, darkness, etc.) based on parameters of the drawing tool properties during the processing interval, such as pressure, speed, angle, and rotation of the drawing tool. The artwork editing system can determine the start point for a next stroke processing interval from the point on the parallel line formed from the projection for a current stroke processing interval. Accordingly, the artwork editing system can render a stroke based on the stroke input in a piecewise linear fashion, with each linear segment corresponding to a sampling interval of the stroke input and rendered with visual properties based on the drawing tool during the sampling interval. Hence, a designer can easily draw parallel and straight strokes, or curved concentric strokes, all while maintaining control over the stroke's visual properties based on how the designer wields the drawing tool.

In one example, the artwork editing system exposes a user interface with an option or selection to render a stroke on a constraint path (e.g., parallel to a constraint path with no distance between the constraint path and the rendered stroke). When this option is selected (e.g., user-selected), the artwork editing system may move the start point of a stroke input to the point on the constraint path that is closest to the start point of a stroke. Hence, the artwork editing system can equate the parallel line as discussed above with the tangent line as discussed above, and renders the stroke on the tangent line based on the stroke input (e.g., draws the stroke on the tangent line with visual properties based on properties of the drawing tool).

Accordingly, the artwork editing system allows a designer to draw a stroke on a digital artwork with a drawing tool, while simultaneously constraining the stroke and controlling the stroke's visual properties based on how the designer wields the drawing tool. Hence, a designer can easily and precisely draw any suitable stroke, such as parallel streaks to represent rain or motion, or curved concentric streaks around an object to represent vibration, while controlling the visual properties of the rendered stroke based on the designer's tactile control of the drawing tool.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes computing device 102 depicted as a desktop computer. A desktop computer is one example of computing device 102, which can generally include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing device 102 may range from full resource devices with substantial memory and processor resources (e.g., personal computers, game consoles) to a low-resource device with limited memory or processing resources (e.g., mobile devices).

Notably, computing device 102 can include any suitable number of computing devices, such as one or more computing devices, (e.g., a smart phone connected to a tablet). Furthermore, discussion of one computing device of computing device 102 is not limited to that one computing device, but generally applies to each of the computing devices included in computing device 102.

Various types of input devices and input instrumentalities can be used to provide input to computing device 102. For example, computing device 102 can recognize input as being a mouse input, drawing-tool input, stylus input, touch input, input provided through a natural user interface, and the like. Thus, computing device 102 can recognize multiple types of gestures including touch gestures and gestures provided through a natural user interface. In one example, computing device 102 includes speech recognition, identification, and synthesis functionalities, microphones, and speakers that allow computing device 102 to communicate with a user in a conversation, e.g., a user conversation.

Figure 8:
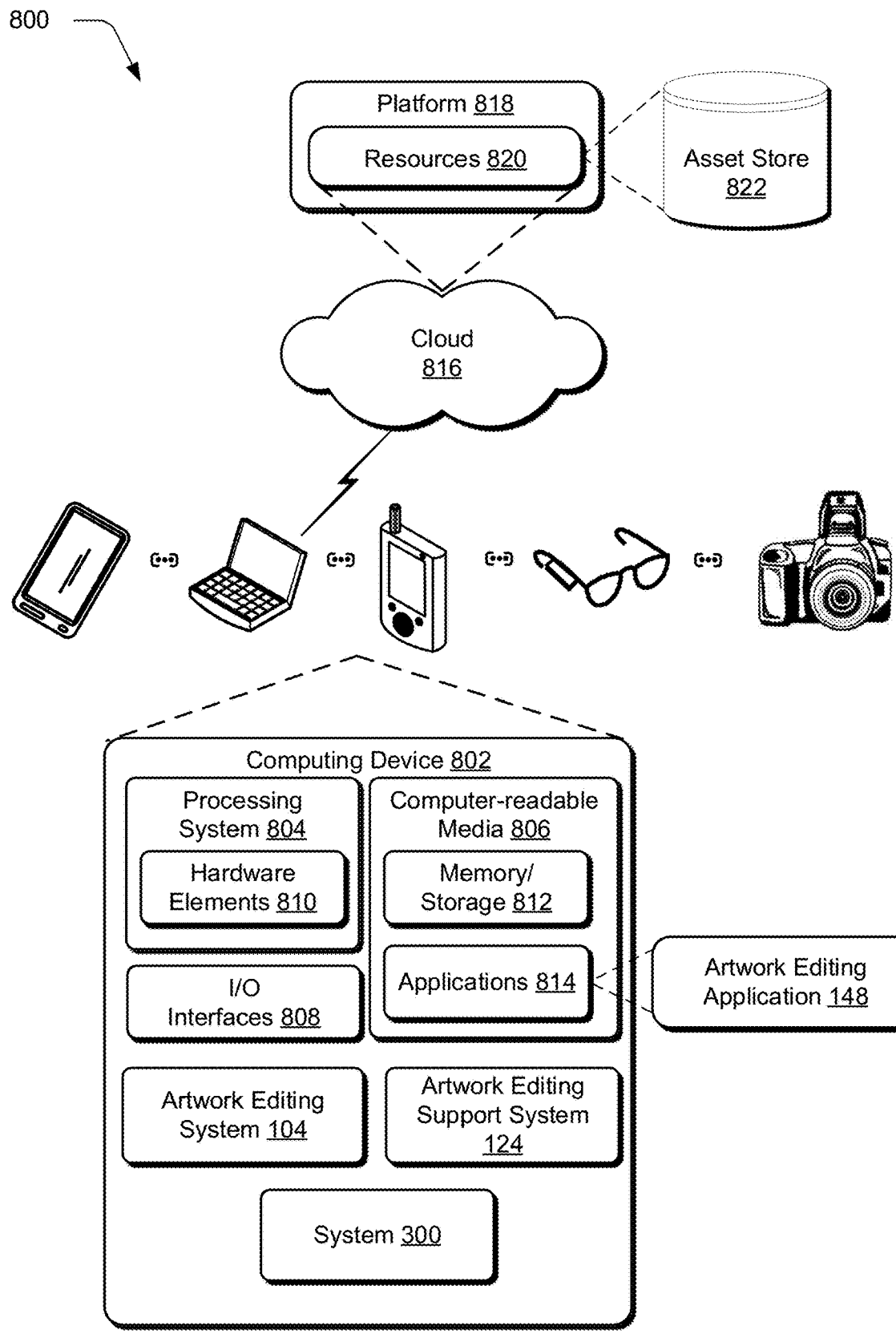
FIG. 8 illustrates an example system including various components of an example device that can be implemented as any type of computing device as described and/or utilized with reference to FIGS. 1-7 to implement aspects of the techniques described herein.

Furthermore, computing device 102 may be representative of one or a plurality of different devices, such as one or more devices connected to a network that perform operations "over the cloud" as further described in relation to FIG. 8. In one example, computing device 102 includes multiple computing devices communicatively coupled to each other, such as with a low power wireless communication standard (e.g., a Bluetooth® protocol). Hence, an asset (e.g., digital image, video, text, drawing, artwork, document, file, and the like) generated, processed, edited, or stored on one device of computing device 102 (e.g., a desktop computer) can be communicated to, and displayed on and processed by another device of computing device 102 (e.g., a tablet).

Computing device 102 includes artwork editing system 104 to edit digital artworks, including drawing path-constrained strokes that are drawn with a drawing tool, where the strokes have visual properties based on properties of the drawing tool (e.g., how the drawing tool is wielded by a designer). As used herein, an artwork means a digital artwork in a digital medium environment. In the example illustrated in FIG. 1, computing device 102 obtains digital artwork 106 and digital artwork 108, which are examples of digital artworks that can be edited by artwork editing system 104. Artwork 106 and artwork 108 can be obtained by artwork editing system 104 in any suitable way, such as from another computing device, from file storage on computing device 102, supplied by a user and received on computing device 102, and the like. In one example, at least one of artwork 106 or artwork 108 includes a rasterized image. Additionally or alternatively, at least one of artwork 106 or artwork 108 can be represented by curves, such as n-th order polynomial splines, (e.g., n=1, 2, 3, or 4), Bezier segments, combinations thereof, and the like. In one example, at least one of artwork 106 or artwork 108 is represented by a mesh of primitives (e.g., a triangle mesh of an object of an image).

Both of the artworks 106, 108 depict a ball 110 and include a line 112, which is an example of a line that can be drawn with a pen or line tool of artwork editing system 104. For instance, line 112 can be drawn by enabling a line tool, clicking with a mouse on one end of the line 112, holding a mouse button, moving a cursor with the mouse to the other end of the line 112, and releasing the mouse button. Additionally or alternatively, the line 112 can be constructed by clicking on the start and then end points in sequence. A width, or thickness, of the line 112 may be set by selecting a number from a drop-down menu.

Artwork 106 also includes a stroke 114, which is an example of a stroke drawn with a drawing tool, such as a stylus, having tool properties that control the visual properties of the stroke 114 (e.g., the rendering of the stroke 114). For instance, a user may draw the stroke 114 with a stylus on a touchscreen of computing device 102, and the visual properties of stroke 114 when rendered may be determined by how the user wields to the stylus, such as based on the pressure on the touchscreen induced by the stylus, an angle of the stylus relative to the touchscreen, a rotation of the stylus about its axis, a speed of the stylus across the touchscreen, combinations thereof, and the like. In one example, the harder the user presses on the touchscreen with the stylus, the darker the stroke 114 will be as it is rendered on artwork 106. Additionally or alternatively, the stroke 114 can have a larger width (or thickness) when the stylus is held closer to being perpendicular to the touchscreen than when the stylus is further from being perpendicular to the touchscreen. Additionally or alternatively, the stroke 114 can be smoother (e.g., less rough at the edges) when the stylus is moved across the touchscreen more slowly than when the stylus is moved across the touchscreen quickly.

As shown in this example, stroke 114 is not straight, and therefore it is not parallel to the line 112 in artwork 106. This is because for artwork 106, the line 112 is not designated as a constraint path. Accordingly, stroke 114 is rendered in artwork 106 as a nonlinear curve that is not quite parallel to the line 112, based on how the designer may move the drawing tool.

In contrast, in artwork 108, line 112 has been designated as a constraint path. For instance, a user may select in a user interface of artwork editing system 104 to make line 112 a constraint path, such as by clicking on line 112 with a mouse and selecting a "make constraint path" button. Accordingly, based on line 112 being designated as a constraint path, when a user draws stroke 116 and stroke 118 of artwork 108 with a drawing tool, such as a stylus, not only are the visual properties of the stroke 116 and the stroke 118 rendered based on how the user wields the drawing tool, but artwork editing system 104 also renders the stroke 116 and the stroke 118 parallel to the line 112. Hence, by designating a path such as line 112 as a constraint path, artwork editing system 104 allows a designer to draw a stroke on a digital artwork with a drawing tool, while simultaneously constraining the stroke based on the constraint path and controlling the stroke's visual properties based on how the designer wields the drawing tool.

Computing device 102 is also coupled to network 120, which communicatively couples computing device 102 with server 122. Network 120 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 122 may include one or more servers or service providers that provide services, resources, assets, or combinations thereof to computing device 102. Services, resources, or assets may be made available to artwork editing system 104, artwork editing support system 124, or combinations thereof, and stored at assets 126 of server 122. Hence, artwork 106 can include any suitable asset stored at assets 126 of server 122.

Server 122 includes artwork editing support system 124 configurable to receive signals from computing device 102, process the received signals, and send the processed signals to computing device 102 to support path-constrained drawing with visual properties based on a drawing tool. For instance, computing device 102 may obtain any suitable representation of an image, such as a rasterized image, and communicate any suitable data (e.g., a constraint path and stroke parameters for each stroke processing interval of a stroke) to server 122. Server 122, using artwork editing support system 124, may generate end points for a rendered stroke for each stroke processing interval from the data received from computing device 102. Server 122 may then send the end points for the stroke back to computing device 102, which can render the stroke at each stroke processing interval based on the end points received from server 122. Accordingly, artwork editing support system 124 of server 122 can include a copy of artwork editing system 104.

Computing device 102 includes artwork editing system 104 for path-constrained drawing with visual properties based on a drawing tool. Artwork editing system 104 includes a display 128, which can expose any suitable data used by or associated with artwork editing system 104. In one example, display 128 displays a user interface for exposing assets, such as digital images, digital artworks, strokes, selections of drawing tools, edited artworks, combinations thereof, and the like. Display 128 can expose a user interface configurable to designate a constraint path and draw a stroke on a digital artwork with a drawing tool, while simultaneously constraining the stroke based on the constraint path and controlling the stroke's visual properties based on how the designer wields the drawing tool.

Display 128 can include any suitable type of display, such as a touchscreen, liquid crystal display, plasma display, head-mounted display, projector and screen, and the like. A touchscreen of display 128 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like.

Artwork editing system 104 also includes processors 130. Processors 130 can include any suitable type of processor, such as a graphics processing unit, central processing unit, digital signal processor, processor core, combinations thereof, and the like. Hence, artwork editing system 104 may be implemented at least partially by executing instructions stored in storage 132 on processors 130. For instance, processors 130 may execute portions of artwork editing application 148 (discussed below in more detail).

Artwork editing system 104 also includes storage 132, which can be any suitable type of storage accessible by or contained in artwork editing system 104. Storage 132 stores data and provides access to and from memory included in storage 132 for any suitable type of data. For instance, storage 132 includes user interface data 134 including data associated with user interfaces, such as user preferences (e.g., font size and style, locations and sizes of panels presented in a user interface, or preferred by users, and the like), data of users operating a user interface (e.g., user histories of edits including user-selections), and indications of drawing tools used or preferred by users. User interface data 134 may also include drawing tool parameters (e.g., calibration parameters, default values, and the like that affect a rotation, speed, angle, force, or pressure of a drawing tool), user interface configurations (e.g., different layouts, language options, etc.), controls and adjusters (e.g., sliders, lists of user gestures to control a user interface, etc.), options for menu selections, such as lists, tabs, pull-down menus, etc. User interface data 134 may also include lists of operating systems supported by various user interfaces, thumbnail images of artworks to display in a user interface, toolbar icons, speech libraries for voice-actuated commands and gestures, artworks exposed in a user interface, such as user-supplied artworks to be edited, edited artworks, and the like.

Storage 132 also includes stroke data 136 including data related to stroke inputs, such as drawing tool properties (e.g., a speed, a rotation, a pressure, a force, or an angle of a drawing tool), stroke parameters (e.g., a thickness, a darkness, a smoothness, etc.) for a stroke input, and points of stroke inputs (e.g., start points and end points of a stroke input for stroke processing intervals). Stroke data 136 may also include a path of a stroke input (a trajectory, coordinates, position, and the like that describe a path of a stroke input), an indication of a drawing tool used to generate a stroke input (e.g., a designator for a stylus, a finger, a brush tool, etc.), and the like.

Storage 132 also includes sampling data 138 including data related to samples of a stroke input, such as stroke processing intervals (e.g., sampling intervals, such as a duration of time between adjacent sampling points of a stroke input), start points of a stroke input, and end points of a stroke input. Sampling data 138 may also include an indication of a method used to determine stroke processing intervals (e.g., based on a refresh rate, based on an elapsed time between sample points of a stroke input, based on a constraint path, based on a distance between sample points of a stroke input, etc.), a curvature of a constraint path used to determine stroke processing intervals, a sampling index (e.g., a number in a sequence of stroke processing intervals), a frequency of stroke processing intervals (e.g., a sampling frequency), and the like.

Storage 132 also includes constraint data 140 including data related to constraint paths for a digital artwork, such as an indication of a user-selected constraint path and an indication of a type of a constraint path (e.g., a Bezier curve, an order of a curve, such as cubic, an unconstrained curve, such as a freely-drawn curve that does not satisfy a mathematical equation, a line, etc.). Constraint data 140 may also include a curvature of a constraint path (e.g., based on one or more derivatives, such as a derivative of a tangent line to a constraint path), a tangent line to a constraint path, a normal line to a constraint path, points on a constraint path (e.g., a point on a constraint path that is closest to a start point of a stroke input), and the like.

Storage 132 also includes rendering data 142 including data related to rendering strokes on a digital artwork processed by or generated by artwork editing system 104, such as digital artworks, stroke parameters (e.g., a thickness, a darkness, a smoothness, etc.), and line segments of a rendered stroke having stroke parameters determined from drawing tool properties (e.g., a pressure, a rotation, a tilt, or a speed of a drawing tool). Rendering data 142 may also include an indication of a constraint path for a rendered stroke, an indication of whether a rendered stroke is to be rendered on a constraint path, a line on which a stroke input is rendered for a stroke processing interval, start points of a stroke input, end points of a stroke input, constrained end points for a stroke input, and the like.

Furthermore, artwork editing system 104 includes transceiver module 144. Transceiver module 144 is representative of functionality configured to transmit and receive data using any suitable type and number of communication protocols. For instance, data within artwork editing system 104 may be transmitted to server 122 with transceiver module 144. Furthermore, data can be received from server 122 with transceiver module 144. Transceiver module 144 can also transmit and receive data between computing devices of computing device 102. In one example, transceiver module 144 includes a low power wireless communication standard (e.g., a Bluetooth® protocol) for communicating data between computing devices of computing device 102.

Artwork editing system 104 also includes artwork gallery module 146. Artwork gallery module 146 is representative of functionality configured to obtain and manage digital artworks, including digital images, of artwork editing system 104, such as artworks that can be edited (e.g., by drawing strokes on the digital artwork with a drawing tool), artworks in an animation sequence, thumbnail representations displayed in a user interface (e.g., thumbnail images of artworks in an animation sequence exposed in a user interface), images including a mesh, a rasterized image, artworks represented by vector graphics, and the like. Hence, artwork gallery module 146 may use transceiver module 144 to obtain any suitable data from any suitable source, including obtaining digital artworks from a user's directory of files on computing device 102 or server 122; obtaining images from a user's photo gallery (e.g., an online photo sharing service, images stored in a user's image editing application, such as Photoshop®); obtaining images a user has posted in a social media post, blog, online comment, and the like; images a user has attached to an email, text, or other communication sent from or received by computing device 102; artworks provided by a search service, such as an online search for digital artworks related to a search query; images obtained from a database of stock images, artworks provided by a user (e.g., receiving user-supplied artworks), images captured by a computing device, such as with a camera integrated into computing device 102, and the like. Artworks obtained by artwork gallery module 146 are stored in storage 132 and made available to modules of artwork editing application 148.

Artwork editing system 104 also includes artwork editing application 148. Artwork editing application 148 includes user interface module 150, stroke parameter module 152, sampling module 154, constraint path module 156, stroke processing module 158, and stroke rendering module 160. These modules work in conjunction with each other to facilitate path-constrained drawing with visual properties based on a drawing tool.

Furthermore, although the description of artwork editing system 104 and artwork editing application 148 describes path-constrained drawing with visual properties based on a drawing tool in a digital artwork, artwork editing system 104 and artwork editing application 148 can be used for path-constrained drawing with visual properties based on a drawing tool for any suitable asset, such as a document, web page, map, slide presentation, image frames of a video or animation sequence, and the like.

User interface module 150 is representative of functionality configured to generate, manage, and cause display of any suitable user interface, such as a user interface including a digital artwork. A user interface of user interface module 150 can expose any suitable artworks or images, such as an input artwork (e.g., an artwork to be edited), an output artwork (e.g., an artwork that has been edited), an animation sequence of images or artworks, thumbnail representations of images and artworks, combinations thereof, and the like.

A user interface of user interface module 150 can expose any suitable control options, such as options for selecting digital artworks, including lists of artworks and thumbnail representations of artworks, options for selecting any suitable parameter used by artwork editing system 104, options to enable a drawing tool (e.g., a switch to turn on a stylus that communicates with a touchscreen on which the user interface is exposed), options to select a line tool to draw straight lines, options to enable a pen tool to draw curves (e.g., unconstrained curves that may not adhere to a mathematical formula), options to draw or import Bezier curves, options to select a stroke-sampling method, combinations thereof, and the like. In one example, a user interface of user interface module 150 exposes an option to make a path a constraint path, such as a switch that can be selected to enable a currently-highlighted curve (e.g., a line drawn with a line tool or Bezier curve selected by a user) as a constraint path. Additionally or alternatively, a user interface of user interface module 150 can expose an option to render a stroke on a constraint path, such as a switch that can be selected to render a stroke input drawn with a drawing tool on top of a constraint path.

In one example, a user interface of user interface module 150 exposes an option to select a curve that is determined from a digital artwork (e.g., a raster image) that is either part of the digital artwork or a template of the digital artwork as a constraint path. Artwork editing system 104 can determine the curve from the digital artwork in any suitable way, such as from an output of an edge-finding algorithm, or from outlines found by an adaptive model (e.g., a neural-network or machine learning algorithm), such as an object-detection algorithm or foreground-background separation algorithm.

A user interface of user interface module 150 can receive any suitable user input. In one example, a user interface of user interface module 150 receives user-input indicating a selection of a constraint path, and a stroke input drawn with a drawing tool (e.g., a stylus). The user interface renders the stroke input on the digital artwork parallel to the constraint path with stroke parameters (e.g., a thickness, a darkness, or a smoothness) based on tool properties of the drawing tool (e.g., a pressure, a rotation, a tilt, or a speed of the drawing tool).

In one example, a user interface of user interface module 150 exposes thumbnail representations of artworks or images, such as artworks retrieved from artwork gallery module 146. A user can select a thumbnail representation of an artwork and cause the selected artwork to be exposed in the user interface, so that the user may draw path-constrained strokes on the artwork with a drawing tool and control the visual properties of the rendered stroke (e.g., thickness, darkness, and smoothness) based on how the user wields the drawing tool. For instance, a user may adjust how they hold and control the drawing tool to adjust the pressure (e.g., the force), the rotation, the tilt, or the speed of the drawing tool to affect the visual properties of the rendered stroke while constraining the rendered stroke relative to a constraint path (e.g. so that the rendered stroke is parallel to the constraint path).

A user interface generated by user interface module 150, along with any suitable information, such as configurations settings of the user interface, user gestures (e.g., user inputs), thumbnail artworks, user preferences, artworks exposed in a user interface, user inputs, stroke inputs, stroke parameters, drawing tool properties, user selections (e.g., selections of constraint paths), combinations thereof, and the like, used by or calculated by user interface module 150 are stored in user interface data 134 of storage 132 and made available to modules of artwork editing application 148. In one example, a user interface generated by user interface module 150 is displayed by display 128, and user interface module 150 receives user inputs indicating a constraint path and a stroke input. The user interface renders the stroke input constrained by the constraint path (e.g., parallel to the constraint path, or on top of the constraint path), and with visual properties, such as thickness, darkness, and smoothness, based on the properties of the drawing tool used to draw the stroke input, including at least one of a pressure, a rotation, a tilt, or a speed of the drawing tool.

Stroke parameter module 152 is representative of functionality configured to determine stroke parameters for a stroke input based on one or more tool properties of a drawing tool used to draw the stroke input. Stroke parameter module 152 can determine any suitable stroke parameters of a stroke input, such as thickness (e.g., width of a stroke), darkness, smoothness, roughness, opacity, holes or voids of a stroke (e.g., a percentage of fill), combinations thereof, and the like. In one example, stroke parameter module 152 determines stroke parameters for a stroke input while the stroke input is drawn on a digital artwork with a drawing tool. For instance, stroke parameter module 152 may determine stroke parameters for a stroke input during stroke processing intervals for the stroke input determined by sampling module 154.

Stroke parameter module 152 can determine stroke parameters for a stroke input based on any suitable tool property of a drawing tool used to draw the stroke input. For instance, a user may draw a stroke input with a drawing tool (e.g., a stylus, finger, etc.) on a touchscreen of computing device 102, and stroke parameter module 152 may determine stroke parameters for the stroke input based on tool properties determined by how the user wields the drawing tool. Stroke parameter module 152 can map stroke parameters to tool properties in any suitable way. In one example, the tool properties include a force or pressure of the drawing tool on the touchscreen, such as a downward force on the touchscreen. Stroke parameter module 152 determines a darkness of a stroke input based on the force of the drawing tool. For instance, a larger force (e.g., the harder the user presses on the touchscreen with the drawing tool), causes the rendered stroke to be darker. A smaller force (e.g., the lighter the user presses on the touchscreen with the drawing tool), causes the rendered stroke to be lighter (e.g., less dark).

Additionally or alternatively, the tool properties can include an angle of the drawing tool relative to the touchscreen, such as an angle from perpendicular (e.g., an angle of zero may correspond to a normal when the drawing tool is perpendicular to the touchscreen, and an able of 90 degrees may correspond to when the drawing tool is parallel to the touchscreen, such as laying on the touchscreen). Stroke parameter module 152 may determines a thickness (e.g., a width) of a stroke input based on the angle of the drawing tool between zero and 90 degrees. For instance, for smaller angles (e.g., closer to 0 degrees, or when the drawing tool is closer to perpendicular to the touchscreen), stroke parameter module 152 may cause a stroke input to be rendered with a larger width (or thickness) than for larger angles (e.g., closer to 90 degrees, or when the drawing tool is further from being perpendicular to the touchscreen).

Additionally or alternatively, the tool properties can include a speed of the drawing tool across the touchscreen. Stroke parameter module 152 may determine a smoothness of a stroke input based on a speed of the drawing tool. For instance, for lower speeds, such as when the drawing tool is moved across the touchscreen more slowly, stroke parameter module 152 may cause a stroke to be smoother when rendered (e.g., less rough at the edges) than for higher speeds, such as when the drawing tool is moved across the touchscreen more quickly.

Additionally or alternatively, the tool properties can include a rotation of the drawing tool, such as a rotation about a major axis of the drawing tool. Stroke parameter module 152 may determine an opacity of a stroke input based on a rotation of the drawing tool. For instance, for rotation angles closer to a reference angle (e.g., a user-designated reference angle), stroke parameter module 152 may cause a rendered stroke to be more opaque than for rotation angles further from the reference angle.

The aforementioned examples of stroke parameters and their dependence on tool properties are examples of a mapping between stroke parameters and tool properties. Stroke parameter module 152 can, however, determine stroke parameters for tool properties based on any suitable mapping between stroke parameters and tool properties. Additionally or alternatively, stroke parameter module 152 can map stroke parameters to any suitable input of a natural media brush simulation engine or any other form of brush engine implemented in conjunction with a drawing tool. In one example, a user may designate a mapping of tool properties to stroke parameters. For instance, a user may designate that a stroke parameter (e.g., any one of stroke darkness, thickness, smoothness, opacity, etc.) can be associated with a tool property (e.g., any one of pressure, angle, speed, rotation, etc.). Stroke parameter module 152 may determine stroke parameters while a stroke input is drawn on a digital artwork with a drawing tool based on one or more tool properties of the drawing tool according to the user-specified mapping.

Stroke parameters determined by stroke parameter module 152, along with any suitable information, such as a mapping (e.g., a mapping of tool properties to stroke parameters or a mapping of stroke parameters to tool properties), an indication of whether the mapping is user-selected, tool properties (e.g., pressure, speed, angle, rotation, etc.), an indication of a drawing tool (e.g., an identification number of a stylus), and the like, used by or calculated by stroke parameter module 152 are stored in stroke data 136 of storage 132 and made available to modules of artwork editing application 148. In one example, stroke parameter module 152 provides stroke parameters to stroke rendering module 160 for each stroke processing interval determined by sampling module 154.

Sampling module 154 is representative of functionality configured to determine stroke processing intervals for a stroke input, and a start point and an end point of the stroke input for each stroke processing interval. Sampling module 154 can determine stroke processing intervals, start points, and end points in any suitable way. In one example, sampling module 154 determines stroke processing intervals (e.g., sampling intervals for a stroke input) based on a constraint path to ensure that the constraint path is sufficiently sampled (e.g., so that no aliasing occurs). For instance, sampling module 154 may determine stroke processing intervals based on a curvature of the constraint path. Sampling module 154 may determine a curvature of a constraint path in any suitable way, such as from one or more derivatives of a tangent line to the constraint path, a radius of a circle fitting a portion of a constraint path, combinations thereof, and the like. By determining stroke processing intervals based on the curvature of a constraint path, sampling module 154 determines shorter stroke processing intervals for more-curved constraint paths than for less-curved constraint paths. Hence, sampling module 154 can determine start points and end points that are closer together for more-curved constraint paths than for less-curved constraint paths. In one example, sampling module 154 determines the stroke processing intervals not only based on the curvature of a constraint path, but also a speed of a stroke input to ensure the distance between start points and end points is less than a threshold distance. The threshold distance may be determined from the curvature of the constraint path. By reducing the stroke processing intervals and the distance between start points and end points of a stroke processing interval, sampling module 154 ensures that the constraint path is not aliased, and a stroke input can be rendered parallel to a constraint path that retains the shape of the constraint path (e.g., without omitting any highly-curved portions of the constraint path).

In one example, sampling module 154 determines stroke processing intervals including sub-dividing the constraint path to account for high curvature, loops, self-intersections, discontinuities, and the like on the constraint path. For instance, sampling module 154 may determine first and second points on the constraint path that represent the closest points on the constraint path to the start point and end point of a stroke input for a stroke processing interval, respectively. Sampling module 154 can sub-divide the segment of the constraint path between the first point and the second point, such as by selecting a mid-point on the constraint path between the first point and the second point. Artwork editing system 104 may determine a tangent line to the constraint path through any suitable point between the first point and the second point, such as the mid-point, and use this tangent line to constrain a stroke relative to the constraint path. Sampling module 154 can repeat sub-dividing the constraint path any suitable number of times, such as by sub-dividing the constraint path between the mid-point and the first point, and determine a tangent line to the constraint path through any suitable point between the mid-point and the first point. Accordingly, artwork editing system 104 can facilitate path-constrained drawing with visual properties based on a drawing tool for constraint paths with high curvature, loops, self-intersections, discontinuities, and the like.

Additionally or alternatively, sampling module 154 may determine stroke processing intervals based on a time duration, such as a time between samples (e.g., a start point and an end point for a stroke processing interval). The time duration may be determined from a refresh rate of display 128. In one example, the time duration can be set by a user, such as via a user interface of user interface module 150. For instance, a user may adjust a duration of stroke processing intervals determined by sampling module 154 by adjusting a slider control in a user interface of user interface module 150.

Additionally or alternatively, sampling module 154 may determine stroke processing intervals based on a distance, such as a distance of a stroke input (e.g., a distance between samples of the stroke input). In one example, a distance can be set by a user, such as via a user interface of user interface module 150. For instance, a user may adjust a slider control in a user interface of user interface module 150 to set a distance, such as a percentage of a display size, a number of pixels, etc. If a user does not specify a distance, sampling module 154 may select a default distance (e.g., 50 pixels). Sampling module 154 can set the start point and end point of the stroke input according to the distance, so that the length of the stroke input between the start point and the end point does not exceed the distance. Hence, sampling module 154 can determine the stroke processing intervals from the distance between the start point and the end point, and a speed of the stroke input.

In one example, sampling module 154 determines the start point for a current stroke processing interval from a point for a previous stroke processing interval, such as a constrained end point for a previous stroke processing interval. For instance, sampling module 154 can determine the start point for a current stroke processing interval from a point on a line on which the stroke input is rendered for the previous stroke processing interval, thus maintaining the continuity of the rendered stroke (discussed below in more detail with respect to FIG. 2).

Stroke processing intervals, and start points and end points of a stroke input for each stroke processing interval determined by sampling module 154, along with any suitable information, such as lines through start points on which a stoke input is rendered for a stroke processing interval, a distance between a start point and an end point of a stroke input for a stroke processing interval, a duration of stroke processing intervals, curvature of a constraint path, user-selections (e.g., selections of a method of determining a stroke processing interval), a tangent line of a constraint path, and the like, used by or calculated by sampling module 154 are stored in sampling data 138 of storage 132 and made available to modules of artwork editing application 148. In one example, sampling module 154 provides start points and end points for each stroke processing interval to constraint path module 156 and stroke processing module 158, and a start point and for each stroke processing interval to stroke rendering module 160.

Figure 2:
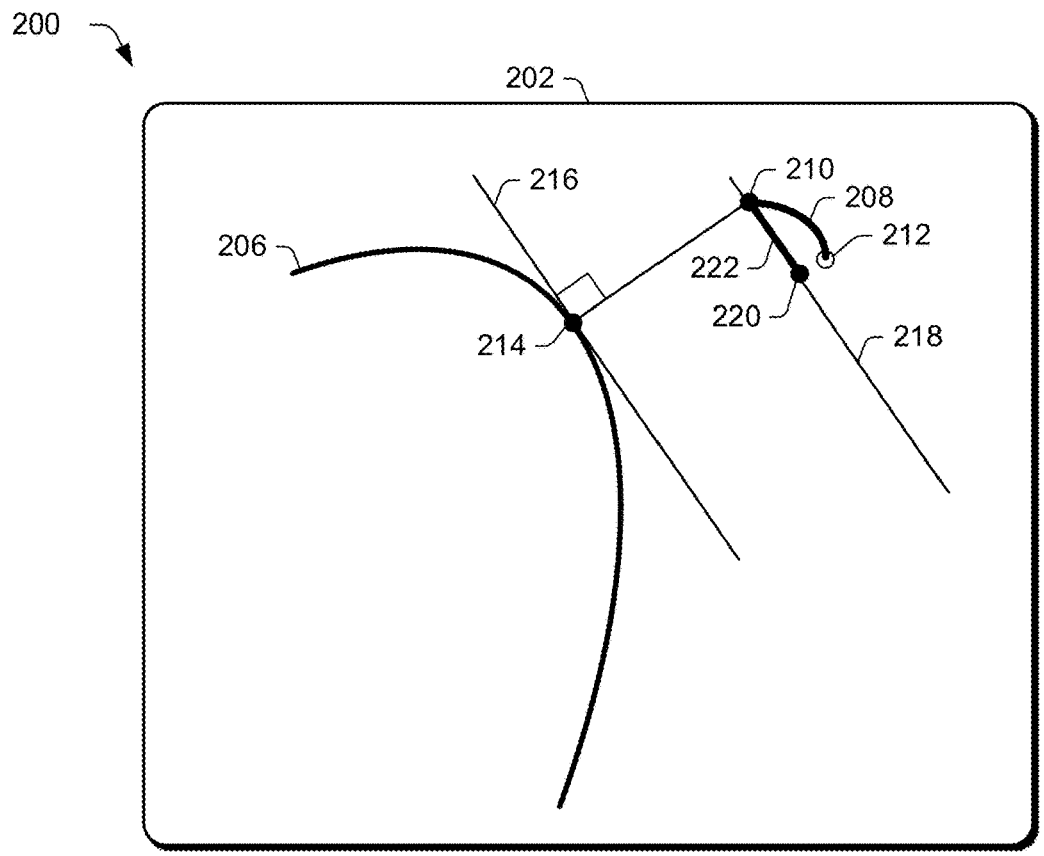
FIG. 2 illustrates example digital artworks in accordance with one or more aspects of the disclosure.
Figure 2:
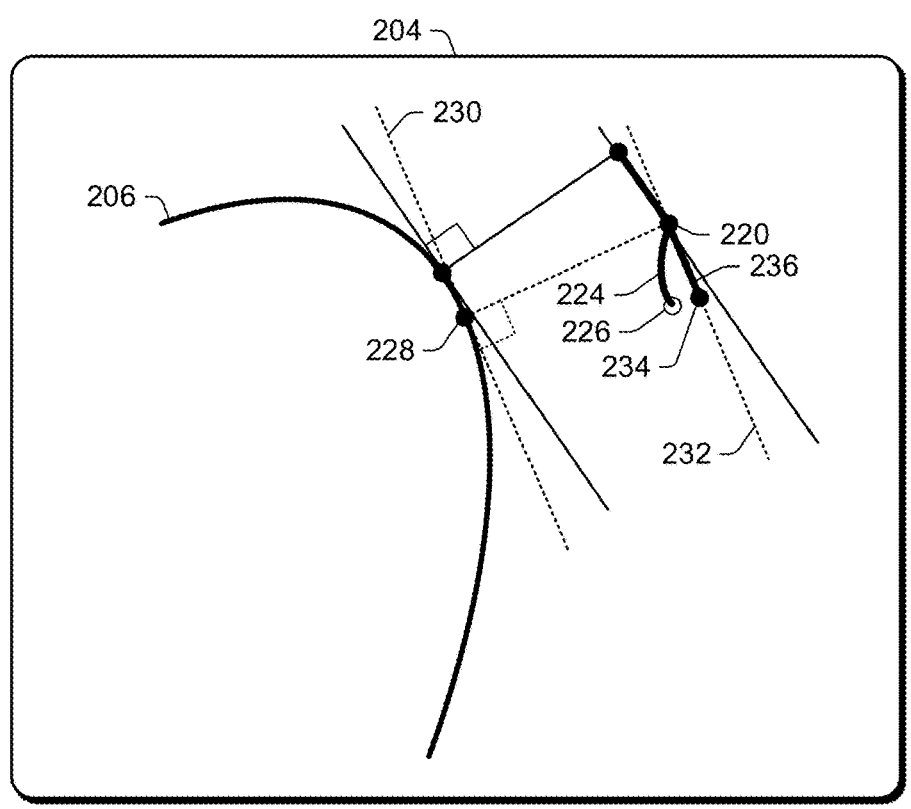

In the following, constraint path module 156, stroke processing module 158, and stroke rendering module 160 are discussed jointly. FIG. 2 is an example that illustrates the joint operation of these modules. Constraint path module 156 is representative of functionality configured to process constraint paths. In one example, constraint path module 156 determines, for each stroke processing interval determined by sampling module 154, a point on a constraint path that is closest to a start point of a stroke input. Constraint path module 156 can determine, for each stroke processing interval, a tangent line that is tangent to the constraint path at the point on the constraint path closest to the start point of the stroke input.

Stroke processing module 158 is representative of functionality configured to process stroke inputs. In one example, stroke processing module 158 determines, for each stroke processing interval determined by sampling module 154, a line that is parallel to the tangent line determined by constraint path module 156 and also through the start point of the stroke input. Stroke processing module 158 can project, for each stroke processing interval, the end point of the stroke input to a point on this line (e.g., the line that is parallel to the tangent line) to form a constrained end point.

Stroke rendering module 160 is representative of functionality configured to render strokes with stroke parameters determined from drawing tool properties. In one example, stroke rendering module 160 renders a stroke for each stroke processing interval on the line determined by stroke processing module 158 (e.g., the line parallel to the tangent line). For instance, stroke rendering module 160 can render the stroke input for each stroke processing interval determined by sampling module 154 linearly (e.g., as a line segment) between the start point and the constrained end point (e.g., the point projected onto the line). Each line segment has visual properties according to the stroke parameters, such as thickness, darkness, and smoothness, determined from the drawing tool properties (e.g., an angle, speed, rotation, and force of the drawing tool).

Accordingly, constraint path module 156, stroke processing module 158, and stroke rendering module 160 can jointly operate to support path-constrained drawing with visual properties based on a drawing tool, such as by rendering a stroke based on a stroke input in a piecewise linear fashion parallel to a constraint path. The operation of constraint path module 156, stroke processing module 158, and stroke rendering module 160, are further described with reference to examples shown in FIG. 2.

FIG. 2 illustrates example digital artworks 200 in accordance with one or more aspects of the disclosure. Digital artworks 200 include artwork 202 and artwork 204. Artwork 202 corresponds to a first (e.g., current) stroke processing interval, and artwork 204 corresponds to a second (e.g., next or subsequent, relative to the current) stroke processing interval. The first and second stroke processing intervals are examples of stroke processing intervals determined by sampling module 154.

Artwork 202 illustrates a first (e.g., current) stroke processing interval and includes constraint path 206. Constraint path 206 is an example of a user-designated constraint path, such as a Bezier curve imported into artwork 202 or freeform curve drawn by a user. Artwork 202 also includes stroke input 208 for the first stroke processing interval. For instance, stroke input 208 may be drawn with a drawing tool (e.g., a stylus). Stroke input 208 has a start point 210 and an end point 212 for the first stroke processing interval. Start point 210 and end point 212 are examples of start points and end points, respectively, determined by sampling module 154.

Constraint path 206 includes point 214, which is an example of a point determined by constraint path module 156 to be closest to the start point 210. For instance, constraint path module 156 may determine point 214 by selecting from all points on constraint path 206 the point having a shortest Euclidean distance to start point 210 of stroke input 208.

Artwork 202 also includes tangent line 216, which is tangent to the constraint path 206 at the point 214, and is an example of a tangent line determined by constraint path module 156. Artwork 202 also includes line 218, which is parallel to the tangent line 216 and through the start point 210 of the stroke input 208. The parallel line 218 is an example of a line determined by stroke processing module 158.

Stroke processing module 158 projects the end point 212 of the stroke input 208 onto line 218, forming point 220 (e.g., a constrained end point). Stroke processing module 158 can project the end point 212 in any suitable way, such as selecting point 220 as a closest point on line 218 to end point 212. Rather than render the stroke input 208 as it is drawn at stroke input 208, stroke rendering module 160 renders the stroke input as the rendered stroke 222, as a line segment along the line 218 between start point 210 and the point 220. Thus, stroke rendering module 160 renders the rendered stroke 222 based on the stroke input 208 constrained by constraint path 206.

Artwork 204 illustrates a second (e.g., next or subsequent) stroke processing interval to the first stroke processing interval illustrated by artwork 202. In artwork 204, the lines, curves, etc. of the first stroke processing interval are retained for reference, though for clarity, numeric designators are omitted. Also for clarity, the lines, curves, etc. of the second stroke processing interval in artwork 204 are dashed, rather than solid.

Artwork 204 includes stroke input 224. Notably, sampling module 154 constrains the start point of stroke input 224 for the second stroke processing interval to be point 220 determined from the first stroke processing interval. Hence, the start point of stroke input 224 is made equal to the constrained end point of the rendered stroke 222 (i.e., point 220), rather than the end point of the stroke input 208 (e.g., end point 212), keeping the rendered stroke continuous over the stroke processing intervals. Stroke input 224 also includes end point 226, which is an example of an end point determined by sampling module 154.

Artwork 204 also includes constraint path 206 (the same constraint path illustrated in artwork 202), and constraint path 206 includes point 228. Point 228 is an example of a point on the constraint path 206 determined by constraint path module 156 to be closest to the point 220 (e.g., the start point of stroke input 224).

Artwork 204 also includes tangent line 230, which is tangent to the constraint path 206 at the point 228, and is an example of a tangent line determined by constraint path module 156. Artwork 204 also includes line 232, which is parallel to the tangent line 230 and through the point 220 (e.g., the start point of stroke input 224). Parallel line 232 is an example of a line determined by stroke processing module 158.

Stroke processing module 158 projects the end point 226 of the stroke input 224 onto line 232, forming point 234 (e.g., a constrained end point). In one example, stroke processing module 158 projects the end point 226 as constrained end point 234 on line 232 by determining a distance of movement along tangent line 230 over the second stroke processing interval, and adding this distance to point 220 along parallel line 232 to form constrained end point 234. Rather than render the stroke input 224 as it is drawn at stroke input 224, stroke rendering module 160 renders the stroke input 224 as rendered stroke 236, which is a line segment along the line 232 between point 220 and the point 234. Thus, stroke rendering module 160 renders the rendered stroke 236 based on the stroke input 224 constrained by constraint path 206.

Stroke rendering module 160 renders the rendered stroke 222 and the rendered stroke 236 based on the stroke inputs in a piecewise linear fashion, by rendering a line segment for each stroke processing interval. For clarity in FIG. 2, only two stroke processing intervals are illustrated, so that the rendered stroke includes only two segments, rendered stroke 222 and rendered stroke 236. Stroke rendering module 160 renders each line segment with visual properties (e.g., thickness, smoothness, darkness, opacity, etc.) based on tool properties (e.g., angle, speed, rotation, pressure, etc.) determined by stroke parameter module during the stroke processing interval for the line segment. Also for clarity in FIG. 2, these visual properties are omitted, but are included in subsequent figures.

The example in FIG. 2 illustrates a constraint path 206 that is nonlinear. By using artwork editing system 104, a designer can draw nonlinear curves parallel to constraint path 206 (e.g., concentric curves around an object to represent vibration). Though rendered as piecewise linear segments constrained by the nonlinear constraint path 206, for small stroke processing intervals, the rendered stroke will appear smooth, rather than piecewise linear. When the constraint path is linear, rather than nonlinear like constraint path 206, artwork editing system 104 can render linear strokes constrained by the linear constraint path. Hence, a designer can constrain a stroke input when rendered to be parallel to a constraint path for linear or nonlinear constraint paths, while simultaneously controlling how the stroke input is rendered based on how the designer wields the drawing tool.

In one example, artwork editing system 104 uses multiple constraint paths like constraint path 206 to determine a single tangent line. For instance, a designer may select multiple curves of a digital artwork to simultaneously be constraint paths. Artwork editing system 104 determines a closest point on each of the constraint paths (like point 214 in FIG. 2) to a start point of a stroke input, and determines a single tangent line based on the tangent lines to each of the constraint paths through their respective closest points, such as by an interpolation of these tangent lines (e.g., linear interpolation). Accordingly, artwork editing system 104 allows a designer to make multiple strokes that behave as though they are drawn on constraint paths that are "blend shapes" or "morph shapes" between two source shapes, or draw in correspondence with a perspective grid defined by two lines.

Additionally or alternatively, artwork editing system 104 may, upon start of a stroke input, compute a blend shape (e.g., with a blend shape algorithm) that represents the blend between two blend paths, such as two user-selected paths that are closest to the start point of the stroke input. Artwork editing system 104 can use this blend shape for any suitable visual property of a rendered stroke when a single constraint path is selected, such as constraint path 206.

Returning to FIG. 1, data of constraint paths determined by constraint path module 156, along with any suitable information, such as tangent lines, points on constraint paths, normals to constraint paths, curvature of constraint paths, derivatives of tangent lines, radii of circles fit to constraint paths, and the like, used by or calculated by constraint path module 156 are stored in constraint data 140 of storage 132 and made available to modules of artwork editing application 148. In one example, constraint path module 156 provides a representation of a tangent line to stroke processing module 158.

Data of stroke inputs determined by stroke processing module 158, along with any suitable information, such as stroke coordinates (e.g., paths), start points, end points, constrained end points, lines through start points that are parallel to tangent lines, stroke parameters (e.g., thickness, smoothness, darkness, opacity, etc.), and the like, used by or calculated by stroke processing module 158 are stored in stroke data 136 of storage 132 and made available to modules of artwork editing application 148. In one example, stroke processing module 158 provides a constrained end point for each stroke processing interval to stroke rendering module 160.

Data of rendered strokes determined by stroke rendering module 160, along with any suitable information, such as lines on which a stroke is rendered, line segments, stroke parameters (thickness, smoothness, darkness, opacity, etc.), tool properties (e.g., a pressure, angle, rotation, speed, etc.) of a drawing tool, start points, constrained end points, and the like, used by or calculated by stroke rendering module 160 are stored in rendering data 142 of storage 132 and made available to modules of artwork editing application 148. In one example, stroke rendering module 160 renders a stroke input on a digital artwork, and a user interface of user interface module 150 exposes the digital artwork with the rendered stroke.

Example Image Editing System

Figure 3:
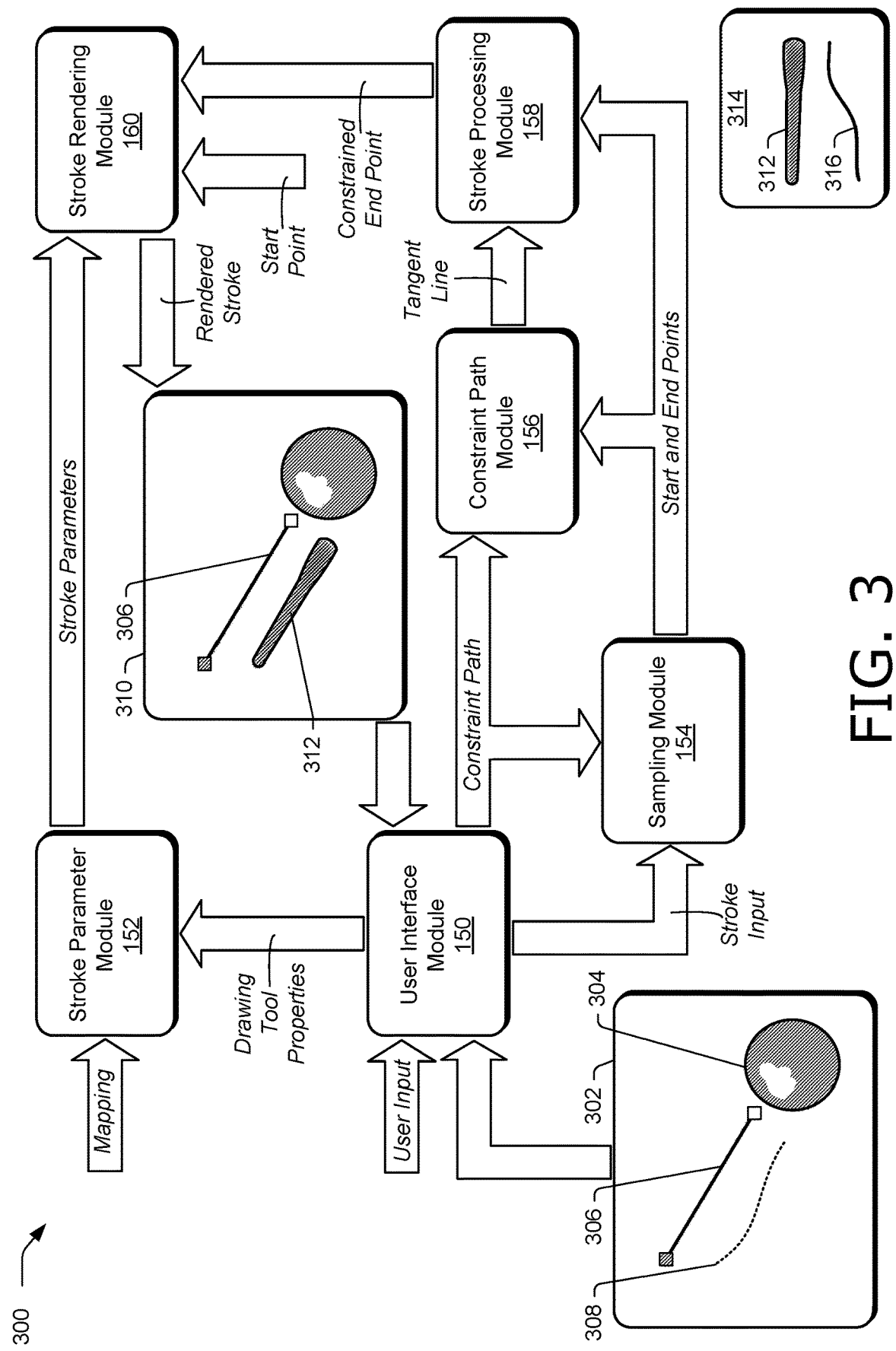
FIG. 3 illustrates an example system usable for path-constrained drawing with visual properties based on a drawing tool in accordance with one or more aspects of the disclosure.

FIG. 3 illustrates an example system 300 usable for path-constrained drawing with visual properties based on a drawing tool in accordance with one or more aspects of the disclosure. In this implementation, system 300 includes the modules of artwork editing application 148 as described in FIG. 1, e.g., user interface module 150, stroke parameter module 152, sampling module 154, constraint path module 156, stroke processing module 158, and stroke rendering module 160. System 300 is one example of artwork editing system 104 that can be constructed using the modules of artwork editing application 148. For instance, signals can be redefined, and modules can be modified, combined, divided, added, or removed to form a modified system, without altering the functionality of system 300. Accordingly, such modified systems are considered to be within the scope of the disclosure.

Furthermore, for simplicity, system 300 is limited to the modules of artwork editing application 148 and a description of some of their interconnects. System 300 can, however, include any suitable signals and communications between modules omitted for simplicity. Such signals may include system clocks, counters, artwork indicators, sequence indicators, path indicators, reset signals, and the like. In one example, system 300 can operate in real time (e.g., with no perceptible delay to a user). Accordingly, signals can be calculated by the modules of system 300 and communicated between the modules of system 300 without significant delay, so that an artwork may be edited and the results exposed in a user interface without perceptible delay to a user.

Moreover, system 300 can be implemented on any suitable device or devices. In one example, system 300 is implemented on one computing device (e.g., computing device 102 in FIG. 1). In another example, system 300 is implemented on more than one computing device. For instance, parts of system 300 can be implemented by a first computing device, such as one computing device of computing device 102 in FIG. 1, and other parts of system 300 can be implemented by an additional computing device of computing device 102. In one example, a server implements parts of system 300, such as server 122 in FIG. 1. A server can be remote, e.g., because it is not collocated with the first computing device. A server may be configured to receive signals of system 300 from a computing device (e.g., computing device 102), process the received signals, such as with artwork editing support system 124, and transmit results of the processing back to the computing device. Hence, artwork editing support system 124 of server 122 in FIG. 1 may include system 300.

Additionally or alternatively, parts of system 300 can be implemented by an additional computing device that is collocated with a first computing device. For instance, one device of computing device 102 may be a first computing device, and another device of computing device 102 may be an additional, collocated computing device. The first computing device and the additional computing device may be operated by one or more users. Hence, system 300 provides for multiple users within an environment to share data included in system 300.

System 300 obtains artwork 302. System 300 can obtain artwork 302 in any suitable way. For instance, a user may supply artwork 302 to system 300, which exposes artwork 302 in a user interface of user interface module 150. Artwork 302 depicts ball 304, and includes constraint path 306. Constraint path 306 is an example of a user-designated constraint path. A user may designate constraint path 306 as a constraint path in any suitable way. In one example, a user draws constraint path 306 with a line tool by clicking on the end points of constraint path 306 in a user interface of user interface module 150. The user may then select a "make constraint path" button in the user interface, designating constraint path 306 as a constraint path. Additionally or alternatively, a user may hover over constraint path 306 for a threshold amount of time (e.g., at least 2 seconds) to designate constraint path 306 as a constraint path. In one example, a user may hover over constraint path 306 for a threshold amount of time while "stroking" the constraint path 306 (e.g., moving a finger over the constraint path 306 without touching the constraint path 306) to designate it as a constraint path. Additionally or alternatively, system 300 may provide visual feedback to indicate constraint path 306 is a constraint path, such as by changing the color or animating the display of the constraint path 306.

Artwork 302 also depicts stroke input 308, which is an example of a stroke input drawn with a drawing tool by a user. For instance, a user may draw stroke input 308 on a user interface of user interface module 150 with a drawing tool, such as by tracing stroke input 308 with a stylus on a touchscreen. Hence, stroke input 308 is not a straight line, since it is hand drawn.

Based on stroke input 308 and constraint path 306, system 300 generates artwork 310, in which stroke input 308 is rendered as rendered stroke 312. Rendered stroke 312 is parallel to constraint path 306 (e.g., rendered stroke 312 is centered on a line that is parallel to constraint path 306), and is straight, despite that stroke input 308 is not straight. Rendered stroke 312 is straight because system 300 constrains rendered stroke 312 to be parallel to constraint path 306. Rendered stroke 312 also has visual properties based on tool properties of the drawing tool used to draw stroke input 308. For instance, rendered stroke 312 is narrower in some areas than in others, e.g., based on a pressure applied with the drawing tool.

To generate artwork 310 with rendered stroke 312, user interface module 150 exposes artwork 302 and receives user input. Examples of user input include designating constraint path 306 as a constraint path, such as by drawing a line and enabling a "make constraint path" switch, and drawing stroke input 308 with a drawing tool. While stroke input 308 is input to user interface module 150, user interface module 150 provides drawing tool properties to stroke parameter module 152, such as a pressure (e.g., force), angle, rotation, and speed of the drawing tool. Furthermore, user interface module 150 provides a representation of the stroke input 308 to sampling module 154 while stroke input 308 is input to user interface module 150, and an indication of the constraint path 306 to constraint path module 156.

Sampling module 154 determines stroke processing intervals for the stroke input 308, and system 300 operates for each stroke processing interval determined by sampling module 154 to render stroke input 308 as rendered stroke 312 in real time (e.g., as stroke input 308 is input to user interface module 150). For instance, sampling module 154 determines a start point and an end point of the stroke input 308 for each stroke processing interval. Start point 210 and end point 212 are examples of start and end points, respectively, for a first stroke processing interval, and point 220 and end point 226 are examples of start and end points, respectively, for a second stroke processing interval, as shown and described with reference to FIG. 2.

Sampling module 154 can determine stroke processing intervals for the stroke input 308 in any suitable way, such as based on a clock (e.g., synchronous to a refresh rate of a display device that exposes the user interface of user interface module 150). In one example, sampling module 154 determines stroke processing intervals based on constraint path 306. Additionally or alternatively, sampling module 154 may determine stroke processing intervals based on a user selection, such as a user-selection of a method in a user interface of user interface module 150 (e.g., a method based on a stroke distance, a method based on a fixed time between samples, etc.). For each stroke processing interval, sampling module 154 provides a start point and an end point to constraint path module 156, stroke processing module 158, and stroke rendering module 160.

Stroke parameter module 152 receives drawing tool properties from user interface module 150 over each stroke processing interval. Stroke parameter module 152 can receive any suitable drawing tool property, such as a force (e.g., a pressure induced on a touchscreen by the drawing tool), an angle of the drawing tool relative to the drawing surface, a rotation of the drawing tool (e.g., an angle of rotation relative to a reference point along the drawing tool's major axis), a speed of the drawing tool on the drawing surface, combinations thereof, and the like.

Based on a mapping between tool properties and stroke parameters, stroke parameter module 152 determines stroke parameters over each stroke processing interval. Stroke parameter module 152 can determine any suitable stroke parameter indicating a visual property for a stroke, such as thickness (e.g., width of a stroke), darkness, smoothness, roughness, opacity, holes or voids of a stroke, combinations thereof, and the like. In one example, a user supplies a mapping to system 300, such as by assigning specific visual properties for a stroke to specific tool properties in a user interface of user interface module 150. For instance, a user may assign the visual property of thickness to the tool property of force, and define a range to forces that map to a range of stroke widths. Stroke parameter module 152 provides stroke parameters over each stroke processing interval to stroke rendering module 160.

In one example, a designer may map a measure of difference between a stroke input and a parallel line (e.g., a line parallel to a tangent line) to a visual property of a rendered stroke. For instance, a designer may map a distance between end point 212 of stroke input 208 and additional point 220 on line 218 in FIG. 2 to a thickness of rendered stroke 222. Accordingly, a designer can map divergence from the constraint path or parallel line to thickness, so that the more sloppy the actual drawing is (e.g., the more divergence from the parallel line), the thicker the rendered stroke is, while still centering the rendered stroke on the parallel line.

Constraint path module 156 receives an indication of a constraint path (e.g., constraint path 306) from user interface module 150, and a start point and an end point for each stroke processing interval from sampling module 154. For each stroke processing interval, constraint path module 156 determines a closest point on the constraint path to a start point of the stroke input. Point 214 in FIG. 2 is an example of a closest point on a constraint path to a start point of a stroke input that is determined by constraint path module 156. Constraint path module 156 also determines a tangent line that is tangent to the constraint path at the closest point. Tangent line 216 in FIG. 2 is an example of a tangent line determined by constraint path module 156.

Constraint path module 156 can represent the tangent line in any suitable way. In one example, constraint path module 156 represents the tangent line with coordinates of points on the tangent line. Additionally or alternatively, constraint path module 156 represents the tangent line with at least a coordinate of the closest point on the constraint path to the start point of the stroke input that is determined by constraint path module 156. In one example, constraint path module 156 represents the tangent line as a combination of Cartesian coordinates, such as x and y coordinates that may be normalized (e.g., so as to have a unit length). Constraint path module 156 provides a representation of a tangent line for each stroke processing interval to stroke processing module 158.

Stroke processing module 158 receives, for each stroke processing interval, a representation of a tangent line from constraint path module 156 and a start point and an end point from sampling module 154. Stroke processing module 158 determines a constrained end point for the stroke input for each stroke processing interval from the tangent line, start point, and end point. In one example, stroke processing module 158 determines a constrained end point by projecting the end point of the stroke input received from sampling module 154 onto a line that is parallel to the tangent line determined by constraint path module 156 and through the start point of the stroke input received from sampling module 154. Line 218 in FIG. 2 is an example of a line determined by stroke processing module 158 that is parallel to a tangent line and through a start point of a stroke input, and point 220 is an example of a constrained end point determined by stroke processing module 158.

Stroke processing module 158 can project the end point of the stroke input as a constrained end point on the parallel line in any suitable way. For instance, a constrained end point determined by stroke processing module 158 for a previous stroke processing interval is used as a start point for a stroke input for a next stroke processing interval that follows the previous stroke processing interval. For this next stroke processing interval, stroke processing module 158 determines a vector from the constrained end point of the previous stroke processing interval to the end point of the stroke input for this next stroke processing interval (e.g., a vector from constrained end point 220 to end point 226 in artwork 204 of FIG. 2). Stroke processing module 158 determines the dot product of this vector with a normalized tangent vector representing the tangent line to determine a distance along the tangent line corresponding to movement of the stroke input on the tangent line during this next stroke processing interval. Stroke processing module 158 adds this distance to the constrained end point of the previous stroke processing interval along the parallel line to project the end point of the stroke input as a constrained end point on the parallel line for this next stroke processing interval. Stroke processing module 158 provides a representation of the constrained end point for each stroke processing interval to stroke rendering module 160.

Stroke rendering module 160 receives, for each stroke processing interval, a start point from sampling module 154, a constrained end point from stroke processing module 158, and stroke parameters from stroke parameter module 152. Stroke rendering module 160 renders the stroke input 308 between the start point received from sampling module 154 and the constrained end point from stroke processing module 158 to form a rendered stroke. Stroke rendering module 160 renders the stroke input 308 linearly between these two points to form the rendered stroke, such as by drawing a stroke centered on a line between these two points and including visual properties according to the stroke parameters received from stroke parameter module 152. For instance, stroke rendering module 160 generates a rendered stroke along a line segment for each stroke processing interval with visual properties (e.g., thickness, width, darkness, smoothness, roughness, opacity, holes, voids, etc.) determined from the stroke parameters for the stroke processing interval. Hence, a designer can constrain a stroke input when rendered to be parallel to a constraint path, while simultaneously controlling how the stroke input is rendered based on how the designer wields the drawing tool.

In the example in FIG. 3, stroke rendering module 160 renders the stroke input 308 as rendered stroke 312 in artwork 310. Rendered stroke 312 is parallel to constraint path 306 despite that stroke input 308 is not parallel to constraint path 306. Rendered stroke 312 also has visual properties (e.g., stroke parameters) determined from how the user wields the drawing tool while drawing stroke input 308. For instance, insert 314 shows a representation of rendered stroke 312 plotted above trace 316. Trace 316 can represent any suitable drawing tool property, such as pressure or force over time. As the drawing tool property is increased, the width of rendered stroke 312 is increased in proportion to the amount of increase of the drawing tool parameter. Hence, stroke rendering module 160 generates rendered stroke 312 with visual properties based on the drawing tool properties. Stroke rendering module 160 provides artwork 310 to user interface module 150, which exposes the artwork 310 in real-time as stroke input 308 is received and as rendered stroke 312 is rendered.

The systems described herein constitute an improvement over conventional systems that do not constrain a stroke input, or do not render a stroke with visual properties based on a drawing tool used to generate the stroke input. In contrast, the systems described herein include a user interface that allows a designer to designate a drawn path as a constraint path. By sampling a stroke input as it is being drawn, the systems described herein determine tangent lines to the constraint path for each sampling interval (e.g., stroke processing interval), and render the stroke in a piecewise linear fashion based on the tangent lines. Each linear segment corresponds to a sampling interval of the stroke input, and is rendered with visual properties based on the drawing tool during the sampling interval. Hence, a designer can draw a stroke on a digital artwork with a drawing tool while simultaneously constraining the stroke relative to the constraint path and controlling the stroke's visual properties (e.g., thickness, darkness, smoothness, etc.) based on how the designer wields the drawing tool. For instance, the systems described herein allow a designer to easily and efficiently draw parallel streaks to represent rain or motion, or concentric streaks around an object to represent vibration, unlike conventional artwork editing systems.

Example User Interface

Figure 4:
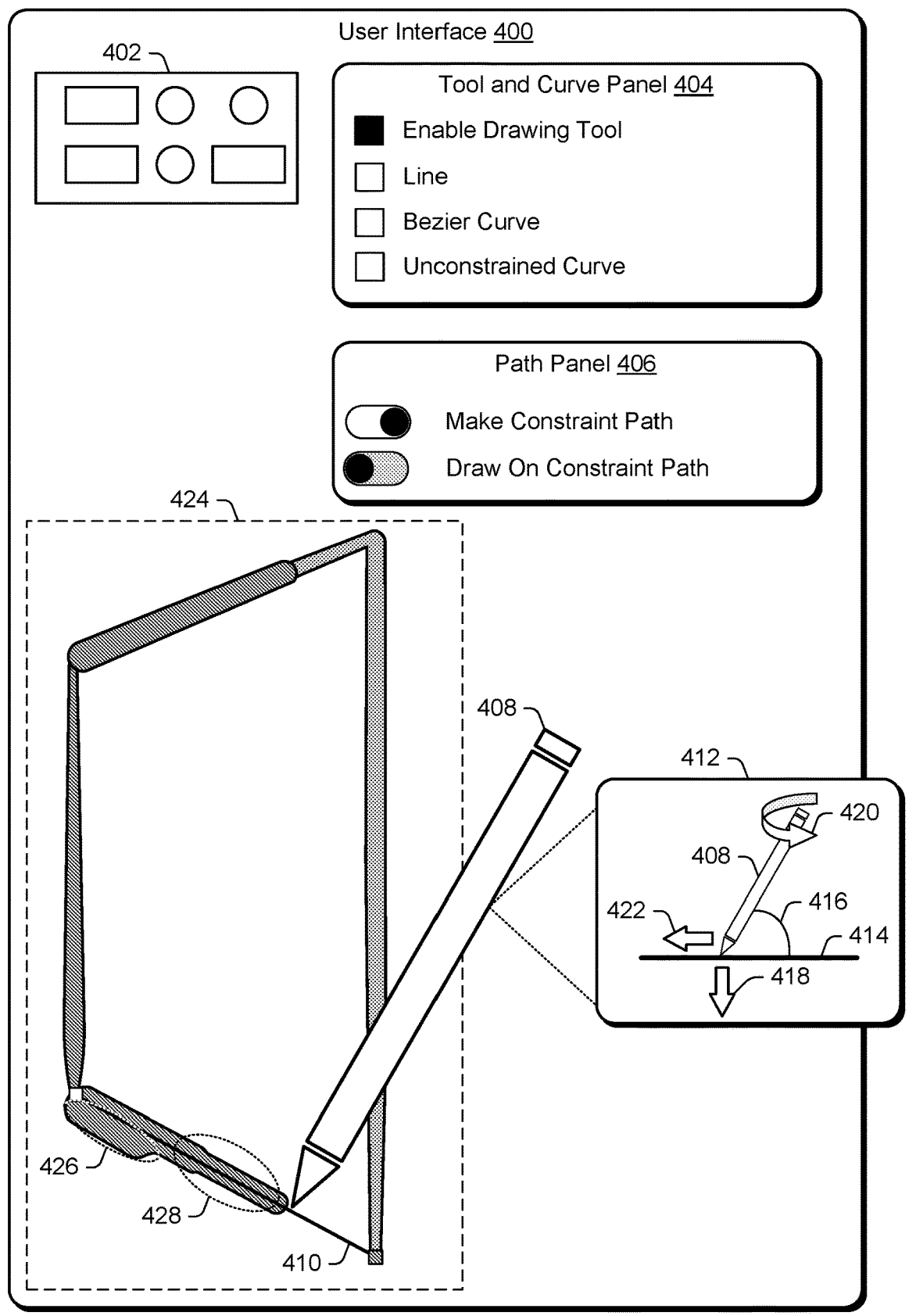
FIG. 4 illustrates an example user interface in accordance with one or more aspects of the disclosure.

FIG. 4 illustrates an example user interface 400 for path-constrained drawing with visual properties based on a drawing tool in accordance with one or more aspects of the disclosure. User interface 400 is an example of a user interface generated and maintained by user interface module 150 in FIG. 2, and can be used for path-constrained drawing with visual properties based on a drawing tool. User interface 400 includes controls 402, suitable to control user interface 400 and its content. Controls 402 can include any suitable control, such as adjusters for brightness, contrast, color, selection of filters, shading, crop, overlay, import, export, font type, size and color, language, zoom, artwork search, types of adjusters presented (e.g., sliders, tabs with numbers, etc.), and the like. In one example, controls 402 include options to control display of panels of user interface 400.

User interface 400 can include any suitable data panels in any suitable position and shape, and the data panels may expose any suitable data, such as in a tool and curve panel 404 and in a path panel 406. Tool and curve panel 404 includes options to enable various tools, such as a drawing tool, a line tool, a Bezier curve tool, and a tool to draw unconstrained curves (e.g., free-form curves that may not obey a mathematical equation). A tool of curve panel 404 can be enabled in any suitable way, such as by selecting a drawing tool icon, keyboard shortcuts, hardware buttons on a stylus or drawing surface, gestures or voice operations, combinations thereof, and the like. In this example in curve panel 404, a user has selected an "enable drawing tool" option in tool and curve panel 404, indicated by the darkened (e.g., black) box. The "enable drawing tool" option in tool and curve panel 404 enables drawing tool 408 to draw on user interface 400.

Path panel 406 includes options for paths (e.g., lines, curves, traces, etc.), and can include any suitable option for a path. In this example, path panel 406 includes an option to "make constraint path" which is illustrated as enabled. For instance, line 410 may be drawn with a line tool of tool and curve panel 404, and designated as a constraint path by selecting it (e.g., clicking on it with a mouse) and enabling the option "make constraint path" in path panel 406. In one example a user hovers with a cursor or finger above line 410 for a threshold amount of time (e.g., at least two seconds) to designate line 410 as a constraint path. Additionally or alternatively, a user may utter a voice command (e.g., speak "make this path a constraint path") to designate line 410 as a constraint path. Hence, line 410 is a constraint path for the digital artwork illustrated in user interface 400.

Drawing tool 408 can include any suitable type of drawing tool. In one example, drawing tool 408 includes an active stylus that communicates with user interface 400, such as with a communications protocol (e.g., amplitude modulation). Additionally or alternatively, drawing tool 408 can include a passive stylus, such as a wand or finger that passively communicates with user interface 400, such as by changing a capacitance on a touchscreen of user interface 400 when drawing tool 408 touches or is in proximity to the touchscreen.

Drawing tool 408 has one or more drawing tool properties, which are illustrated in insert 412. Insert 412 depicts a profile view of drawing tool 408 on surface 414. Surface 414 represents a drawing surface (e.g., a touchscreen) of a device on which user interface 400 is displayed. In insert 412, drawing tool 408 is at an angle 416 relative to surface 414, and exerts a downward force on surface 414 denoted by arrow 418. Insert 412 also depicts a rotation of drawing tool 408 by arrow 420 about a major axis of drawing tool 408 (e.g., the length of drawing tool 408). As drawing tool 408 moves relative to surface 414, the speed of the drawing tool 408 is indicated by arrow 422. The angle 416, force (e.g., pressure) indicated by arrow 418, rotation indicated by arrow 420, and speed indicated by arrow 422 are examples of tool properties of drawing tool 408. These tool properties of drawing tool 408 can be controlled by a designer, such as based on how the designer wields the drawing tool 408, to affect the visual properties of a rendered stroke in a digital artwork. For instance, digital artwork 424 includes rendered strokes with visual properties (e.g., thickness, darkness, smoothness, etc.) based on the tool properties of drawing tool 408 illustrated in insert 412.

In one example, visual properties (e.g., thickness, darkness, smoothness, etc.) determined are determined based on a visual property model, such as a physically-based model, an emulator, a simulator, a machine-learning model (e.g., a neural network), combinations thereof, and the like. For instance, the visual property model may learn, simulate, or imitate the way a particular medium, such as paint, watercolor, charcoal, spray paint, etc., responds to tool properties of drawing tool 408, such as pressure and angle of application. Additionally or alternatively, visual properties may be user-selectable, such as via selection of numbers for a stroke input, or selection of numbers at points along a stroke input, with automatic interpolation between the points. In one example, the visual properties are user-selectable via a mapping which maps visual properties and tool properties of a drawing tool, such as the user selecting pressure as mapping to a range of opacities, brush angle as mapping to a range of thicknesses, and the like.

Digital artwork 424 includes rendered stroke 426 and rendered stroke 428. Rendered stroke 426 and rendered stroke 428 are constrained by the constraint path denoted by line 410, and are thus parallel to line 410. Rendered stroke 426 is parallel to line 410, at a nonzero distance from line 410. Rendered stroke 428, however, is not only parallel to line 410, but is on top of line 410 (e.g., there is no distance between rendered stroke 428 and line 410). This is because for rendered stroke 428, a user has enabled the "draw on constraint path" switch in the path panel 406, which is not enabled for rendered stroke 426. Accordingly, rendered stroke 428 is rendered on top of line 410, even if the stroke input for rendered stroke 428 is offset from line 410.

Hence, using user interface 400, a designer can draw a stroke on a digital artwork with a drawing tool while simultaneously constraining the stroke relative to a constraint path and controlling the stroke's visual properties based on how the designer wields the drawing tool. User interface 400 allows the designer to precisely control the placement of a rendered stroke, even with shaky hands when providing the stroke input, by selecting a path as a constraint path and, if desired, constraining the rendered stroke to be on top of the constraint path.

Example Procedures

Figure 5:
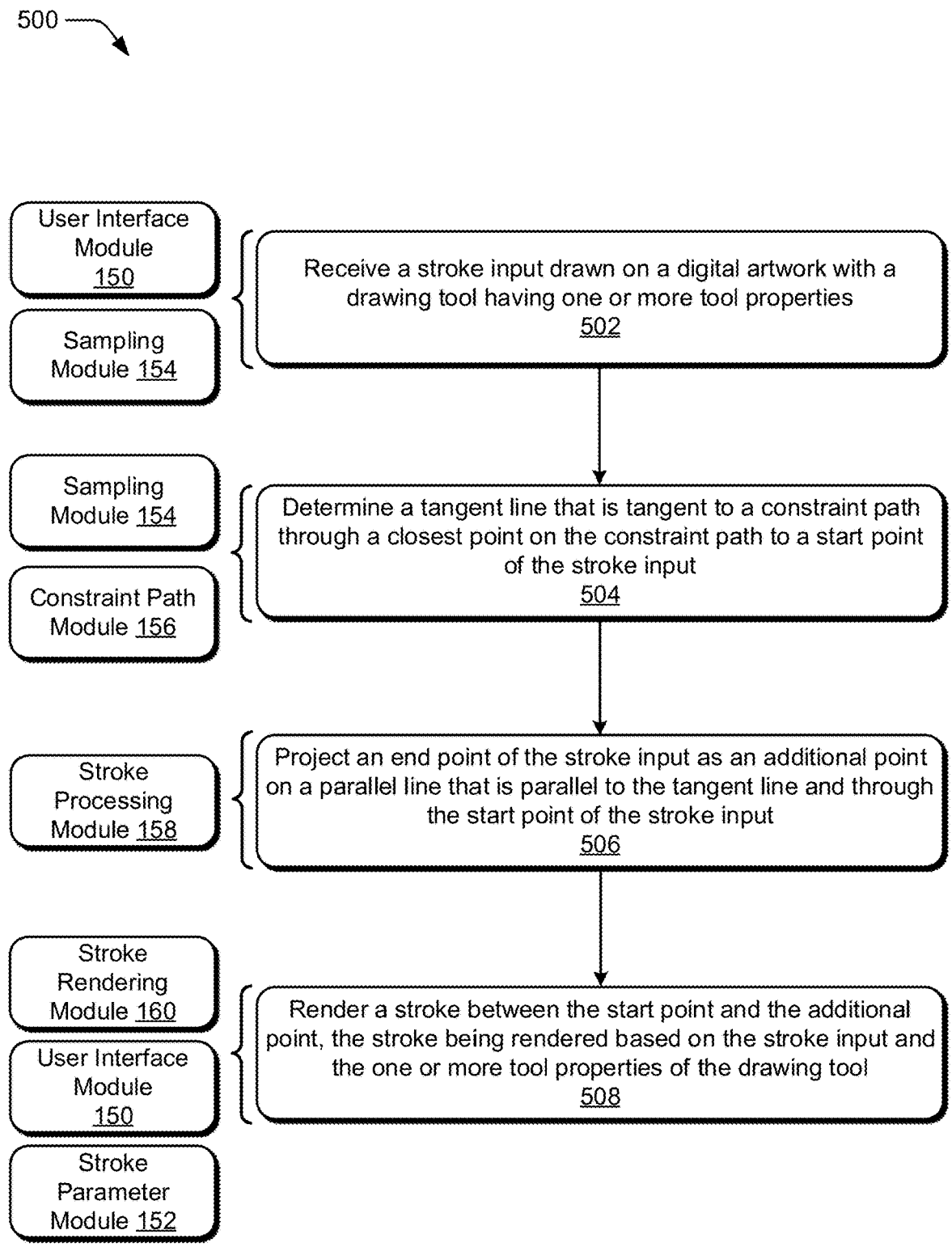
FIG. 5 illustrates a flow diagram depicting an example procedure in accordance with one or more aspects of the disclosure.

FIG. 5 illustrates an example procedure 500 for path-constrained drawing with visual properties based on a drawing tool in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 122 of FIG. 1 that makes use of an artwork editing system, such as system 300 or artwork editing system 104. An artwork editing system implementing procedure 500 may be an independent application that has been installed on the computing device, a service hosted by a service provider that is accessible by the computing device, a plug-in module to the computing device, or combinations thereof.

A stroke input is received as drawn on a digital artwork with a drawing tool having one or more tool properties (block 502). In one example, sampling module 154 receives a stroke input drawn on the digital artwork via a user interface of user interface module 150 with a drawing tool having one or more tool properties.

A tangent line that is tangent to a constraint path through a closest point on the constraint path to a start point of the stroke input is determined (block 504). In one example, constraint path module 156 determines a tangent line that is tangent to a constraint path through a closest point on the constraint path to a start point of the stroke input. Constraint path module 156 can represent the tangent line in any suitable way, such as with a slope, axis intercept point, point coordinates, combinations thereof, and the like.

In one example, user interface module 150 determines a constraint path in a digital artwork, such as by receiving a user selection of a curve or line in a digital artwork. For instance, a user may draw a curve with a pen tool in a user interface of user interface module 150 and designate the curve as a constraint path by selecting a "make constraint path" button. Additionally or alternatively, determining a constraint path can include receiving a user selection of a Bezier curve as the constraint path. For example, determining the constraint path can include receiving an unconstrained curve as the constraint path, such as a free-form curve that may not obey a mathematical equation. The sampling module 154 can determine stroke processing intervals for the stroke input and a start point of the stroke input for each stroke processing interval, and the constraint path module 156 can determine a closest point on the constraint path to the start point of the stroke input.

An end point of the stroke input is projected as an additional point on a parallel line that is parallel to the tangent line and through the start point of the stroke input (block 506). In one example, stroke processing module 158 projects an end point of the stroke input as an additional point on the parallel line, and can determine a parallel line that is parallel to the tangent line and through the start point of the stroke input. Sampling module 154 can determine the end point based on an amount of elapsed time between drawing the start point and drawing the end point, such as by determining the end point when the amount of elapsed time equals a sampling interval time. Additionally or alternatively, sampling module 154 can determine the end point based on a distance between the start point and the end point. Additionally or alternatively, sampling module 154 can determine the end point based on a curvature of the constraint path.

A stroke is rendered between the start point and the additional point (block 508). The stroke is rendered based on the stroke input and one or more tool properties of the drawing tool. In one example, stroke parameter module 152 determines stroke parameters (e.g., visual properties like thickness, smoothness, opacity, darkness, etc.) from the tool properties, and stroke rendering module 160 renders the stroke between the start point and the additional point, where the rendering is based on the stroke input and the stroke parameters. User interface module 150 exposes the rendered stroke having the stroke parameters based on the tool properties in a user interface. In one example, rendering the stroke includes drawing the stroke linearly on the parallel line between the start point and the additional point.

Additionally or alternatively, tool properties of the drawing tool can include at least one of a pressure, a rotation, a tilt, or a speed of the drawing tool. Artwork editing system can render the stroke by drawing the stroke with at least one brush property that is mapped to the pressure, the rotation, the tilt, or the speed of the drawing tool. The brush property (e.g., thickness, darkness, smoothness, etc.) may be based on a brush simulation model, emulator, machine learning model, combinations thereof, and the like.

In one example, as the receiving the stroke input continues, the determining the closest point, the determining the tangent line, the determining the parallel line, the projecting, and the rendering are repeated for a new end point of the stroke input and a new start point of the stroke input as it continues from the additional point on the parallel line. For instance, the determining the closest point, the determining the tangent line, the determining the parallel line, the projecting, and the rendering can be repeated for each stroke processing interval determined by sampling module 154. A start point of a stroke input for a current stroke processing interval can be set to the additional point (e.g., a constrained end point) for the previous stroke processing interval. Additionally or alternatively, rendering the stroke can include drawing the stroke piecewise linearly with a first linear segment between the start point and the additional point and a second linear segment between the additional point and a new additional point formed from the repeating the projecting.

In one example, a user selection indicating to render the stroke on the constraint path is received. For instance, user interface module 150 can receive a user selection indicating to render the stroke on the constraint path. Sampling module 154 may move, responsive to receiving the user selection indicating to render the stroke on the constraint path, the start point of the stroke input to the closest point on the constraint path. Stroke rendering module 160 may render the stroke including drawing the stroke on the tangent line. Additionally or alternatively, the tool properties can include at least one of a pressure, a rotation, a tilt, or a speed of the drawing tool. Rendering the stroke can include drawing the stroke with at least one of a thickness, a darkness, or a smoothness based on one or more of the tool properties.

In one example, the constraint path is based on multiple curves in the digital artwork, such as multiple user-selected curves. For instance, a user interface of user interface module 150 may receive a selection of multiple curves in the digital artwork. Artwork editing system 104 may determine at least two curves from the multiple curves based on the start point of the stroke input, such as two curves that are closest to the start point of the stroke input for a stroke processing interval. Artwork editing system 104 can blend the two curves into a single constraint path. Artwork editing system 104 can use this single constraint path to determine the closest point on the single constraint path to the start point of the stroke input, and the tangent line that is tangent to the single constraint path through the closest point on the single constraint path.

Figure 6:
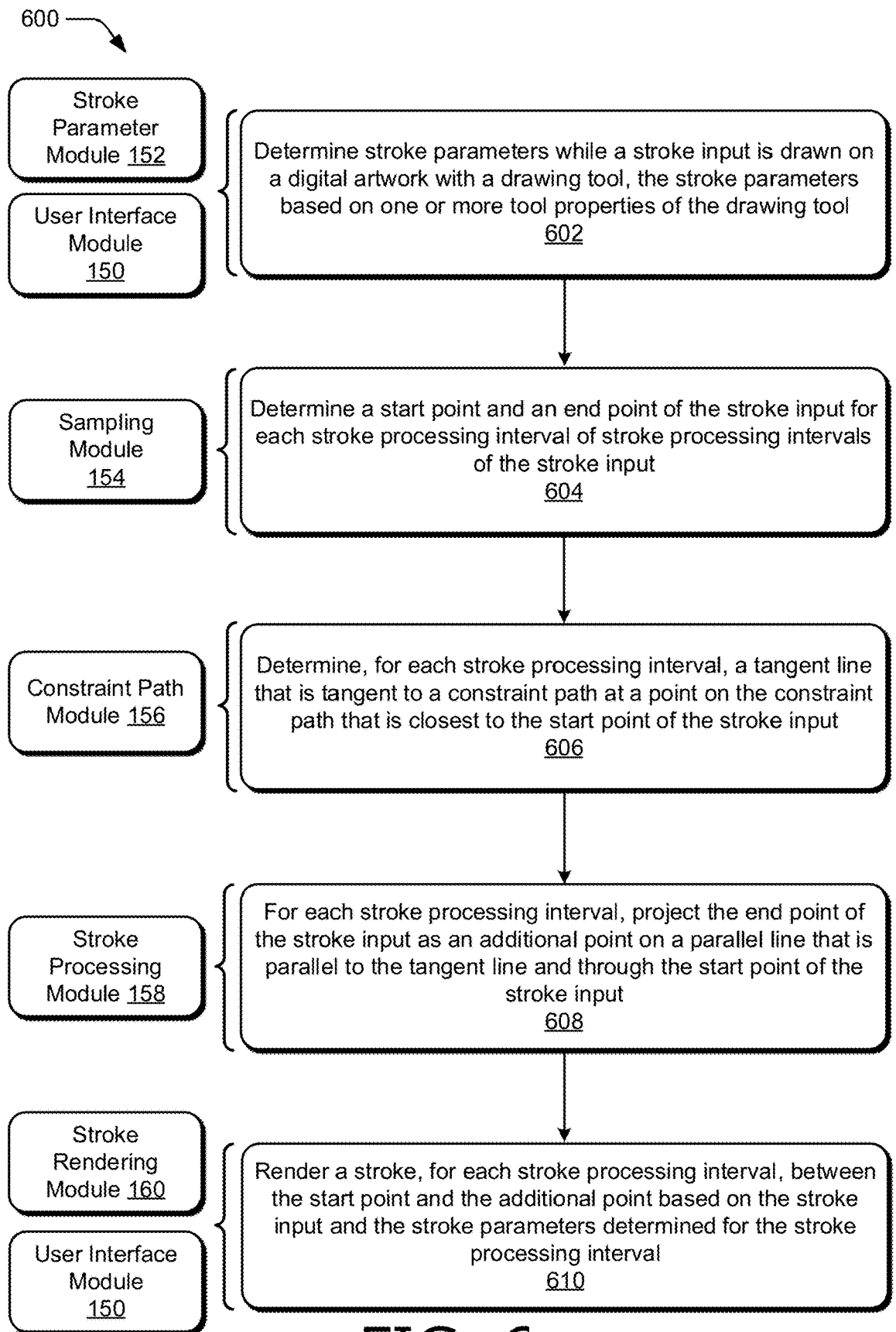
FIG. 6 illustrates a flow diagram depicting an example procedure in accordance with one or more aspects of the disclosure.

FIG. 6 illustrates an example procedure 600 for path-constrained drawing with visual properties based on a drawing tool in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 122 of FIG. 1 that makes use of an artwork editing system, such as system 300 or artwork editing system 104. An artwork editing system implementing procedure 600 may be an independent application that has been installed on the computing device, a service hosted by a service provider that is accessible by the computing device, a plug-in module to the computing device, or combinations thereof.

Stroke parameters are determined while a stroke input is drawn on a digital artwork with a drawing tool, the stroke parameters being based on one or more tool properties of the drawing tool (block 602). In one example, stroke parameter module 152 determines stroke parameters while a stroke input is drawn on a digital artwork with a drawing tool via a user interface of user interface module 150, where the stroke parameters are based on one or more tool properties of the drawing tool. Stroke parameter module 152 can determine the stroke parameters including at least one brush property of a brush rendering engine (e.g., a thickness, a darkness, or a smoothness) for the stroke input based on the tool properties including at least one of a pressure, a rotation, a tilt, or a speed of the drawing tool.

A start point and an end point of the stroke input for each stroke processing interval of stroke processing intervals of the stroke input are determined (block 604). In one example, sampling module 154 determines stroke processing intervals of the stroke input, as well as a start point and an end point for each stroke processing interval of the stroke input. Additionally or alternatively, sampling module 154 can determine the start point for a current stroke processing interval from the additional point of a previous stroke processing interval. In one example, sampling module 154 determines the stroke processing intervals of the stroke input based on a derivative of the constraint path and the speed of the drawing tool to prevent aliasing of the constraint path. A derivative of the constraint path may include a derivative of a tangent line to the constraint path. Additionally or alternatively, sampling module 154 can be configured to determine the stroke processing intervals of the stroke input based on a refresh rate of a display of a computing device.

For each stroke processing interval, a tangent line that is tangent to a constraint path at a point on the constraint path that is closest to the start point of the stroke input is determined (block 606). In one example, constraint path module 156 determines, for each stroke processing interval, a tangent line that is tangent to a constraint path at a point on the constraint path that is closest to the start point of the stroke input.

For each stroke processing interval, the end point of the stroke input is projected as an additional point on a parallel line that is parallel to the tangent line and through the start point of the stroke input (block 608). In one example, stroke processing module 158 projects, for each stroke processing interval, the end point of the stroke input as an additional point on the parallel line. Additionally or alternatively, stroke processing module 158 can determine, for each stroke processing interval, a parallel line that is parallel to the tangent line and through the start point of the stroke input. The additional point can also be referred to as a constrained end point of the stroke input for the stroke processing interval.

A stroke is rendered, for each stroke processing interval, between the start point and the additional point based on the stroke input and the stroke parameters determined for the stroke processing interval (block 610). In one example, stroke rendering module 160 renders the stroke, for each stroke processing interval, between the start point and the additional point based on the stroke input and the stroke parameters determined for the stroke processing interval, and user interface module 150 exposes the rendered stroke in a user interface. Additionally or alternatively, stroke rendering module 160 can be configured to render the stroke as a drawn line between the start point and the additional point for each stroke processing interval, the drawn line having visual properties based on the stroke parameters.

Figure 7:
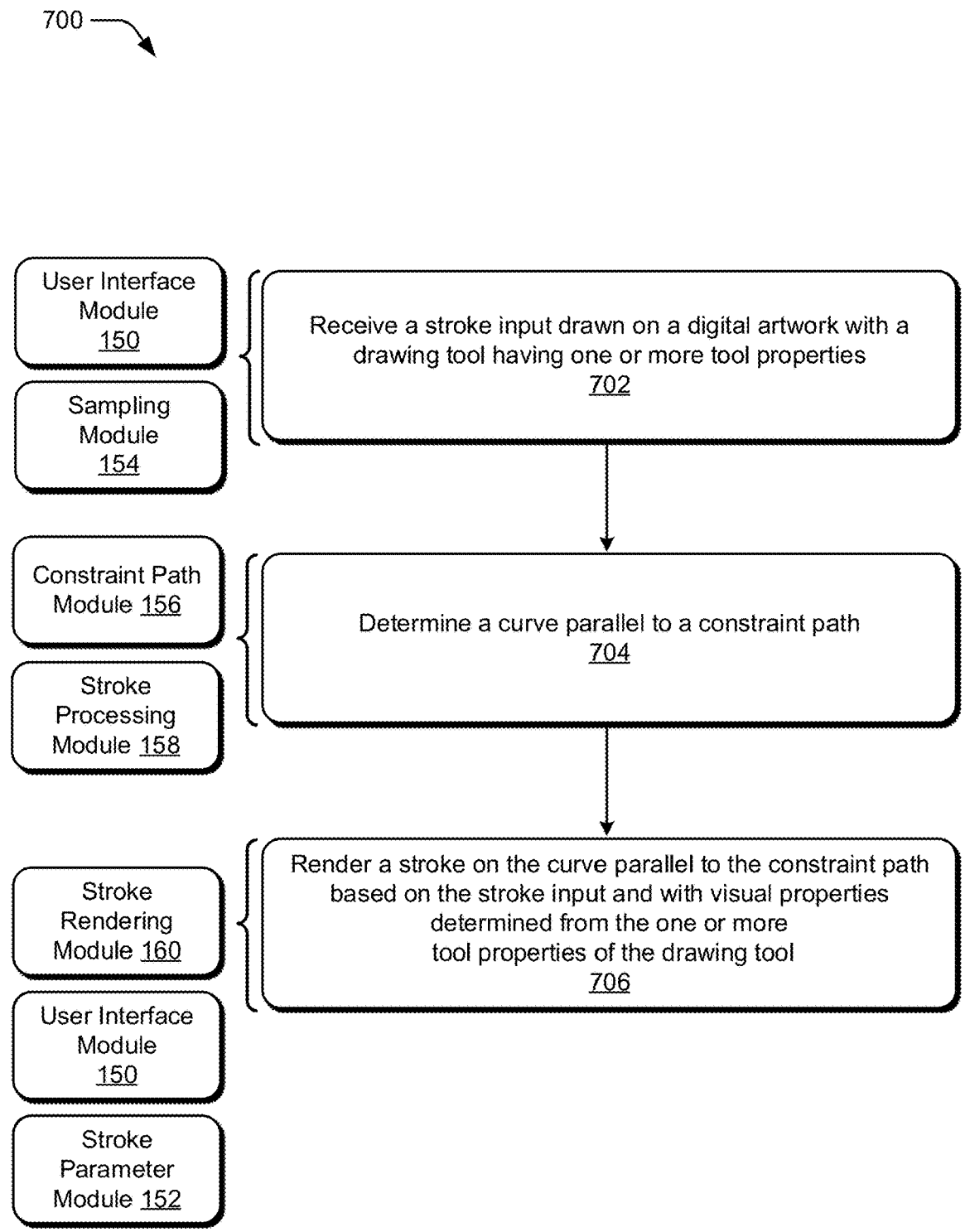
FIG. 7 illustrates a flow diagram depicting an example procedure in accordance with one or more aspects of the disclosure.

FIG. 7 illustrates an example procedure 700 for path-constrained drawing with visual properties based on a drawing tool in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 102 or server 122 of FIG. 1 that makes use of an artwork editing system, such as system 300 or artwork editing system 104. An artwork editing system implementing procedure 700 may be an independent application that has been installed on the computing device, a service hosted by a service provider that is accessible by the computing device, a plug-in module to the computing device, or combinations thereof.

A stroke input is received as drawn on a digital artwork with a drawing tool having one or more tool properties (block 702). In one example, sampling module 154 receives a stroke input drawn on the digital artwork with a drawing tool having one or more tool properties via a user interface of user interface module 150.

A curve parallel to a constraint path is determined (block 704). In one example, constraint path module 156 determines a tangent line to a constraint path at each stroke processing interval, and stroke processing module 158 determines a curve parallel to the tangent line of the constraint path at each stroke processing interval, such as based on start points and end points of the stroke input for each stroke processing interval. Hence, the curve determined by stroke processing module 158 is parallel to the constraint path, such as in a piecewise linear fashion. In one example, the constraint path and the curve include lines (e.g., one or more linear sections). User interface module 150 can receive an indication of the constraint path in the digital artwork, such as a user-selection of a path to designate the path as a constraint path.

A stroke is rendered on the curve parallel to the constraint path based on the stroke input and with visual properties determined from the one or more tool properties of the drawing tool (block 706). In one example, stroke rendering module 160 renders the stroke on the curve parallel to the constraint path. The curve parallel to the tangent line of the constraint path is based on the stroke input, such as based on start points and end points of the stroke input for each stroke processing interval. Stroke parameter module 152 can determine the visual properties (e.g., stroke parameters) from the tool properties of the drawing tool, and user interface module 150 can expose the rendered stroke having the visual properties in a user interface. In one example, a user selection indicating to render the stroke on the constraint path is received. For instance, user interface module 150 can receive a user selection to render the stroke on the constraint path. Responsive to receiving the user selection, the curve is set equal to the constraint path, so that the stroke is rendered on top of the constraint path.

The procedures described herein constitute an improvement over procedures that do not constrain a stroke input, or do not render a stroke with visual properties based on a drawing tool used to generate the stroke input. In contrast, the procedures described herein include a user interface that allows a designer to designate a path as a constraint path. By sampling a stroke input as it is being drawn, the procedures described herein determine tangent lines to the constraint path for each sampling interval (e.g., stroke processing interval), and render the stroke in a piecewise linear fashion based on the tangent lines. Each linear segment corresponds to a sampling interval of the stroke input, and is rendered with visual properties based on the drawing tool during the sampling interval. Hence, a designer can draw a stroke on a digital artwork with a drawing tool while simultaneously constraining the stroke relative to the constraint path and controlling the stroke's visual properties (e.g., thickness, darkness, smoothness, etc.) based on how the designer wields the drawing tool. For instance, the procedures described herein allow a designer to easily and efficiently draw parallel streaks to represent rain or motion, or concentric streaks around an object to represent vibration, unlike procedures of conventional artwork editing systems.

Example Systems and Devices

FIG. 8 illustrates an example system 800 including an example computing device 802 that is representative of one or more computing systems and devices that can be utilized to implement the various techniques described herein. This is illustrated through inclusion of artwork editing system 104, system 300, artwork editing application 148, and artwork editing support system 124, which operate as described above. Computing device 802 may be, for example, a user computing device (e.g., computing device 102), or a server device of a service provider, (e.g., server 122). Furthermore, computing device 802 may include an on-chip system, multiple computing devices, combinations thereof, or any other suitable computing device or computing system. Accordingly, FIG. 8 illustrates computing device 802 as one or more of a tablet, a laptop computer, a smart phone, smart eye glasses, and a camera, though these examples are illustrative and in no way are meant to limit the type or number of devices that may be represented by computing device 802.

The example computing device 802 includes a processing system 804, one or more computer-readable media 806, and one or more I/O interfaces 808 that are communicatively coupled to each other. Although not shown, computing device 802 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 804 is representative of functionality to perform one or more operations using hardware. Accordingly, processing system 804 is illustrated as including hardware elements 810 that may be configured as processors, functional blocks, and so forth. This may include implementation in hardware as an application specific integrated circuit or other logic device formed using one or more semiconductors. Hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 130 in FIG. 1 are an example of processing system 804.

Computer-readable storage media 806 is illustrated as including memory/storage 812. Storage 132 in FIG. 1 is an example of memory/storage of memory/storage 812. Memory/storage 812 may include volatile media (such as random access memory (RAM)), nonvolatile media (such as read only memory (ROM), Flash memory, optical disks, magnetic disks, and so forth), or combinations thereof. Memory/storage 812 may include fixed media (e.g., RAM, ROM, a fixed hard drive, and so on) as well as removable media (e.g., Flash memory, a removable hard drive, an optical disc, and so forth). Computer-readable media 806 may be configured in a variety of other ways as further described below.

Input/output interfaces 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 802 may be configured in a variety of ways as further described below to support user interaction.

Computing device 802 also includes applications 814. Applications 814 are representative of any suitable applications capable of running on computing device 802, and may include a web browser which is operable to access various kinds of web-based resources (e.g., assets, media clips, images, content, configuration files, services, user profiles, and the like). Applications 814 include artwork editing application 148, as previously described. Furthermore, applications 814 includes any applications supporting artwork editing system 104, system 300, and artwork editing support system 124.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 802. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 810, or combinations thereof. Computing device 802 may be configured to implement particular instructions and functions corresponding to the software and hardware modules. Accordingly, implementation of a module that is executable by computing device 802 as software may be achieved at least partially in hardware, e.g., through use of computer-readable storage media and hardware elements 810 of processing system 804. The instructions and functions may be executable/operable by one or more articles of manufacture (for example, one or more computing devices such as computing device 802 or processing systems such as processing system 804) to implement techniques, modules, and examples described herein.

The techniques described herein may be supported by various configurations of computing device 802 and are not limited to the specific examples of the techniques described herein. This functionality may also be implemented all or in part through use of a distributed system, such as over a "cloud" 816 via a platform 818. Cloud 816 includes and is representative of a platform 818 for resources 820. Platform 818 abstracts underlying functionality of hardware (e.g., servers) and software resources of cloud 816. Resources 820 may include applications, data, or applications and data that can be utilized while computer processing is executed on servers that are remote from computing device 802. Resources 820 can also include services provided over the Internet, through a subscriber network, such as a cellular or Wi-Fi network, or combinations thereof. Resources 820 can include asset store 822, which stores assets, such as images, photographs (e.g., user images in a gallery, a database of stock photographs, and the like), document templates, user profile data, user image libraries, photographs posted in a shared photo service, animation sequences, videos, digital images, metadata of assets, and the like, and may be accessed by computing device 802.

Generally, resources 820 may be licensed, purchased, or may be made freely available, (e.g., without authentication, license, or account-based access). The resources 820 can include any suitable combination of services and content, such as an on-line shopping service, an image editing service, an artwork drawing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, digital images, digital artworks, web documents, web pages, applications, device applications, text documents, drawings, presentations, photographs (e.g., stock photographs), user profiles, user preferences, user data (e.g., images stored in an image gallery), maps, computer code, and the like.

Platform 818 may abstract resources and functions to connect computing device 802 with other computing devices. Platform 818 may also serve to abstract scaling of resources to provide a corresponding level of scale to encountered demand for resources 820 that are implemented via platform 818. Accordingly, in an interconnected device embodiment, implementation of functionality described herein may be distributed throughout system 800. For example, the functionality may be implemented in part on computing device 802 as well as via platform 818 that abstracts the functionality of cloud 816.

Conclusion

In one or more implementations, a digital medium environment includes at least one computing device. Systems, devices, and techniques are described herein for path-constrained drawing with visual properties based on a drawing tool. An artwork editing system includes a user interface to designate a path as a constraint path in a digital artwork. The artwork editing system samples a stroke input as it is being drawn with a drawing tool (e.g., a stylus) and constrains the rendered stroke to be parallel to the constraint path over each processing interval. For each processing interval, the artwork editing system determines a start point of the stroke input and a tangent line to the constraint path at a point on the constraint path that is closest to the start point of the stroke input. The artwork editing system projects an end point of the stroke input to a line that is through the start point of the stroke and parallel to the tangent line, and renders the stroke along this line. Hence, the artwork editing system renders the stroke in a piecewise linear fashion, each linear segment corresponding to a processing interval of the stroke input and rendered with visual properties based on the drawing tool during the processing interval. Accordingly, a designer can use the artwork editing system to simultaneously constrain a stroke while controlling the stroke's visual properties based on how the designer wields the drawing tool.

Although implementations of path-constrained drawing with visual properties based on a drawing tool have been described in language specific to features and/or methods, the appended claims are not necessarily limited to the specific features or methods described. Rather, the specific features and methods are disclosed as example implementations of path-constrained drawing with visual properties based on a drawing tool, and other equivalent features and methods are intended to be within the scope of the appended claims. Further, various different examples are described and it is to be appreciated that each described example can be implemented independently or in connection with one or more other described examples.

What is claimed is:

1. In a digital medium environment for path-constrained editing in a digital image, a method implemented by a computing device, the method comprising:
    receiving a designation of a constraint path by which to constrain subsequent drawing inputs on the digital image;
    receiving a drawing input on the digital image;
    determining a tangent line that is tangent to the constraint path through a closest point on the constraint path to a start point of the drawing input;
    projecting an end point of the drawing input as a constrained end point on a parallel line that is parallel to the tangent line and through the start point of the drawing input; and
    rendering a stroke interval of the drawing input between the start point and the constrained end point.

2. The method as described in claim 1, further comprising:
    displaying a user interface of an image editing system, the user interface including a user-selectable option to receive the designation of the constraint path as a constraint path input drawn on the user interface, and the user interface including an additional user-selectable option to constrain the drawing input being rendered over the designated constraint path on the user interface.

3. The method as described in claim 2, further comprising:
    receiving a user selection of the additional user-selectable option to constrain the drawing input being rendered over the designated constraint path; and
    moving the start point of the drawing input to the closest point on the constraint path, wherein the rendering includes the stroke interval being rendered on the tangent line.

4. The method as described in claim 1, wherein the rendering includes the stroke interval represented linearly on the parallel line between the start point and the constrained end point on the parallel line.

5. The method as described in claim 1, further comprising determining the end point of the drawing input based on an elapsed time between receiving the drawing input at the start point and the projecting the end point of the drawing input.

6. The method as described in claim 1, further comprising determining the end point of the drawing input based on a distance between the start point and the end point of the drawing input.

7. The method as described in claim 1, further comprising:
    rendering subsequent stroke intervals of the drawing input piecewise linearly with a first linear segment between the start point and the constrained end point, and at least a second linear segment between the constrained end point and a subsequent constrained end point formed by repeating the projecting.

8. The method as described in claim 1, further comprising:
    receiving the drawing input on the digital image with a drawing tool having one or more tool properties affecting visual parameters of the drawing input, the one or more tool properties including at least one of a pressure, a rotation, a tilt, or a speed of the drawing tool; and wherein
    the rendering includes the stroke interval being rendered with at least one of the tool properties of the drawing tool.

9. The method as described in claim 1, wherein the receiving the designation of the constraint path includes:
    receiving a selection of multiple curves displayed in the digital image;
    determining at least two of the multiple curves based on the start point of the drawing input; and
    blending the at least two of the multiple curves into the constraint path.

10. An image editing system implemented by a computing device in a digital medium environment, the image editing system comprising:
    a user interface module to receive a designation of a constraint path by which to constrain subsequent drawing inputs on a digital image, and receive a drawing input on the digital image;
    a constraint path module to determine a tangent line that is tangent to the constraint path through a closest point on the constraint path to a start point of the drawing input;
    a stroke processing module to project an end point of the drawing input as a constrained end point on a parallel line that is parallel to the tangent line and through the start point of the drawing input; and a stroke rendering module to render a stroke interval of the drawing input between the start point and the constrained end point.

11. The image editing system as described in claim 10, further comprising a user interface of the image editing system, the user interface including a user-selectable option to receive the designation of the constraint path as a constraint path input drawn on the user interface, and the user interface including an additional user-selectable option to constrain the drawing input being rendered over the designated constraint path on the user interface.

12. The image editing system as described in claim 11, wherein:
the user interface module is configured to receive a user selection of the additional user-selectable option to constrain the drawing input being rendered over the designated constraint path; and
the stroke processing module configured to move the start point of the drawing input to the closest point on the constraint path, wherein the stroke interval is rendered on the tangent line.

13. The image editing system as described in claim 10, further comprising a sampling module configured to determine a respective start point and end point for multiple stroke intervals of the drawing input, the sampling module further configured to determine the start point for a subsequent stroke interval from the constrained end point of a previous stroke interval.

14. The image editing system as described in claim 13, wherein the sampling module is configured to determine the stroke intervals of the drawing input based on a refresh rate of a display of the computing device.

15. The image editing system as described in claim 10, wherein the stroke rendering module is configured to render the stroke interval as a drawn line between the start point and the constrained end point for each stroke interval of the drawing input, the drawn line having visual parameters based on one or more tool properties of a drawing tool, the one or more tool properties including at least one of a pressure, a rotation, a tilt, or a speed of the drawing tool.

16. An image editing system implemented by a computing device in a digital medium environment, the image editing system comprising:
a user interface including a user-selectable option to designate a constraint path as a constraint path input drawn on the user interface, and the user interface including an additional user-selectable option to constrain a drawing input over the designated constraint path on the user interface;
a user interface module to receive a user selection of the user-selectable option to designate the constraint path on a digital image, and receive another user selection of the additional user-selectable option to constrain the drawing input over the designated constraint path;
a constraint path module to determine a tangent line that is tangent to the constraint path through a closest point on the constraint path to a start point of the drawing input;
a stroke processing module configured to move the start point of the drawing input to the closest point on the constraint path; and
a stroke rendering module to render a stroke interval of the drawing input between the start point and a constrained end point on the constraint path.

17. The image editing system as described in claim 16, wherein:
the user interface module is configured to receive the constraint path input as a curve drawn on the user interface; and
the stroke rendering module is configured to render the stroke interval of the drawing input over a portion of the curve designated as the constraint path.

18. The image editing system as described in claim 16, wherein the stroke rendering module is configured to render subsequent stroke intervals of the drawing input piecewise linearly with a first linear segment between the start point and the constrained end point on the constraint point, and at least a second linear segment between the constrained end point and a subsequent constrained end point of the at least second linear segment.

19. The image editing system as described in claim 16, further comprising a sampling module configured to determine a respective start point and end point for multiple stroke intervals of the drawing input, the sampling module further configured to determine the start point for a subsequent stroke interval from the constrained end point of a previous stroke interval.

20. The image editing system as described in claim 19, wherein the stroke rendering module is configured to render the stroke interval as a drawn line between the start point and the constrained end point for each of the stroke intervals of the drawing input, the drawn line having visual parameters based on one or more tool properties of a drawing tool, the one or more tool properties including at least one of a pressure, a rotation, a tilt, or a speed of the drawing tool.

\* \* \* \* \*